(12) United States Patent
Mukherjee et al.

(10) Patent No.: US 11,379,379 B1
(45) Date of Patent: Jul. 5, 2022

(54) DIFFERENTIAL CACHE BLOCK SIZING FOR COMPUTING SYSTEMS

(71) Applicant: Marvell Asia Pte, Ltd., Singapore (SG)

(72) Inventors: Shubhendu Mukherjee, Southborough, MA (US); David Asher, Sutton, MA (US); Thomas F. Hummel, Holliston, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/862,705

(22) Filed: Apr. 30, 2020

Related U.S. Application Data

(60) Provisional application No. 62/944,274, filed on Dec. 5, 2019.

(51) Int. Cl.
*G06F 12/121* (2016.01)
*G06F 12/0862* (2016.01)

(52) U.S. Cl.
CPC ........ *G06F 12/121* (2013.01); *G06F 12/0862* (2013.01); *G06F 2212/1021* (2013.01); *G06F 2212/602* (2013.01)

(58) Field of Classification Search
None
See application file for complete search history.

(56) References Cited

U.S. PATENT DOCUMENTS

| | | | |
|---|---|---|---|
| 4,888,679 A | 12/1989 | Fossum et al. | |
| 6,393,536 B1 | 5/2002 | Hughes et al. | |
| 6,412,046 B1 * | 6/2002 | Sharma | G06F 12/0862 711/137 |
| 6,542,968 B1 * | 4/2003 | Spencer | G06F 12/0862 711/137 |
| 10,013,357 B2 | 7/2018 | Mukherjee et al. | |
| 10,331,567 B1 | 6/2019 | Meier et al. | |
| 2003/0154349 A1 * | 8/2003 | Berg | G06F 9/30181 711/137 |
| 2003/0221069 A1 * | 11/2003 | Azevedo | G06F 12/0862 711/136 |
| 2003/0236949 A1 * | 12/2003 | Henry | G06F 12/0862 711/137 |
| 2004/0260908 A1 * | 12/2004 | Malik | G06F 13/161 711/213 |
| 2006/0047915 A1 | 3/2006 | Janik et al. | |
| 2006/0120405 A1 * | 6/2006 | Engbersen | G06F 13/28 370/473 |

(Continued)

*Primary Examiner* — William E. Baughman
(74) *Attorney, Agent, or Firm* — Young Basile Hanlon & MacFarlane, P.C.

(57) ABSTRACT

Described is a computing system and method for differential cache block sizing for computing systems. The method for differential cache block sizing includes determining, upon a cache miss at a cache, a number of available cache blocks given a payload length of the main memory and a cache block size for the last level cache, generating a main memory request including at least one indicator for a missed cache block and any available cache blocks, sending the main memory request to the main memory to obtain data associated with the missed cache block and each of the any available cache blocks, storing the data received for the missed cache block in the cache; and storing the data received for each of the any available cache blocks in the cache depending on a cache replacement algorithm.

23 Claims, 15 Drawing Sheets

(56) References Cited

U.S. PATENT DOCUMENTS

| | | |
|---|---|---|
| 2007/0083714 A1* | 4/2007 | Henry ................ G06F 12/0862 |
| | | 711/137 |
| 2008/0229072 A1 | 9/2008 | Yamamura et al. |
| 2009/0106499 A1* | 4/2009 | Aoki ................... G06F 12/0862 |
| | | 711/137 |
| 2012/0030431 A1* | 2/2012 | Anderson ........... G06F 12/0862 |
| | | 711/137 |
| 2014/0108740 A1* | 4/2014 | Rafacz ............... G06F 12/0862 |
| | | 711/137 |
| 2015/0074328 A1* | 3/2015 | Baryudin ............. G06F 3/0665 |
| | | 711/103 |
| 2015/0378919 A1 | 12/2015 | Anantaraman et al. |
| 2016/0011996 A1 | 1/2016 | Asaad et al. |
| 2017/0269937 A1 | 9/2017 | Eickemeyer et al. |
| 2018/0024931 A1* | 1/2018 | Moyer ................. G06F 12/128 |
| | | 711/137 |
| 2019/0179759 A1 | 6/2019 | Olorode et al. |
| 2019/0286589 A1* | 9/2019 | Kitamura ............... G06F 13/28 |

* cited by examiner

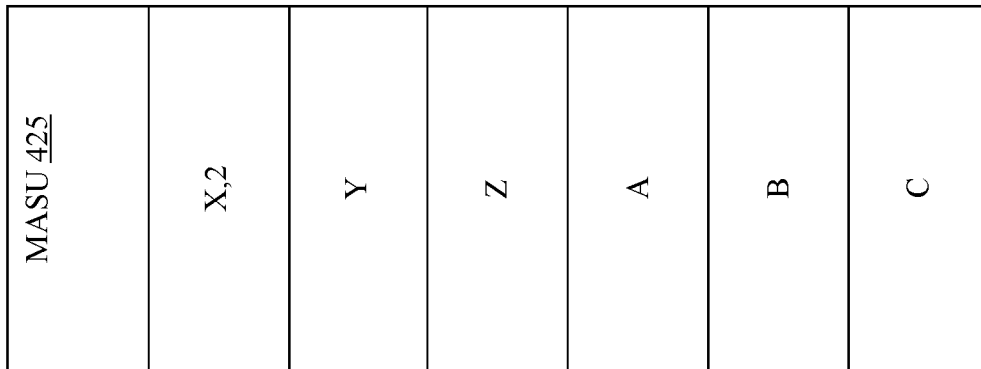
FIG. 4B
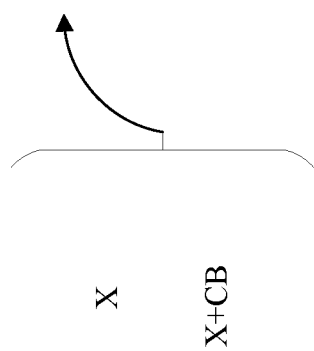
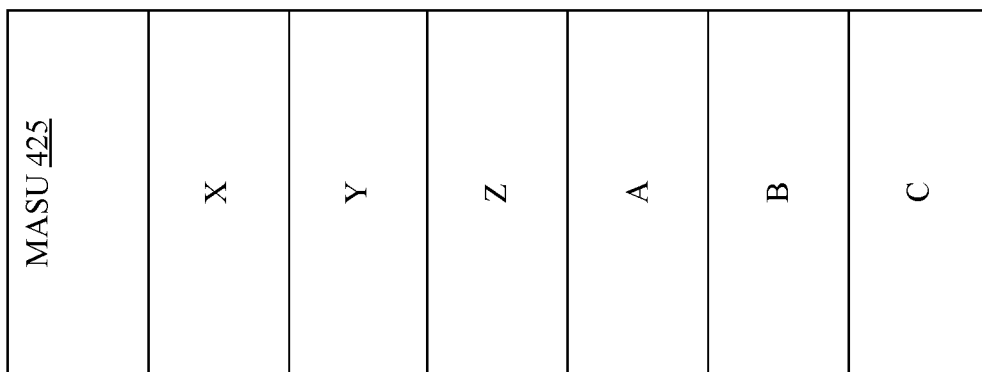
FIG. 4A

FIG. 10

| MASU 1030 |
|---|
| X |
| Y |
| Z |
| A |
| B |
| C |

L3 1020

INTERCONNECT NETWORK 1040

L2 1010

L1 1000

DIFFERENTIAL CACHE BLOCK SIZING FOR COMPUTING SYSTEMS

CROSS-REFERENCE TO RELATED APPLICATION(S)

This application claims priority to and the benefit of U.S. Provisional Application Patent Ser. No. 62/944,274, filed Dec. 5, 2019, the entire disclosure of which is hereby incorporated by reference.

TECHNICAL FIELD

This disclosure relates to differential cache block sizing for computing systems.

BACKGROUND

A processor pipeline includes multiple stages through which instructions advance, a cycle at a time. In a scalar processor, instructions proceed one-by-one through the pipeline, with at most a single instruction being committed per cycle. In a superscalar processor, multiple instructions may proceed through the same pipeline stage at the same time, allowing more than one instruction to issue per cycle, depending on certain conditions (called hazards), up to an issue width. Some processors issue instructions in-order (according to a program order), with consecutive instructions proceeding through the pipeline in program order. Other processors allow instructions to be reordered and issued out-of-order, which potentially increases overall pipeline throughput.

Data caches store data so that future requests for that data can be served faster as instructions progress through the processor pipeline. A cache hit occurs when the requested data can be found in the data cache. This is faster than reading from a slower data store and increases system performance. A cache miss occurs when the requested data is not found in the data cache. Caches typically store and provide blocks of instructions or data in units of cache blocks (also called cache lines).

SUMMARY

Disclosed herein are implementations of differential cache block sizing for computing systems.

In one aspect, in general, a method for differential cache block sizing includes determining, upon a cache miss at a cache, a number of available cache blocks given a payload length of the main memory and a cache block size for the last level cache, generating a main memory request including at least one indicator for a missed cache block and any available cache blocks, sending the main memory request to the main memory to obtain data associated with the missed cache block and each of the any available cache blocks, storing the data received for the missed cache block in the cache; and storing the data received for each of the any available cache blocks in the cache depending on a cache replacement algorithm.

This and other aspects can include one or more of the following features.

The cache miss is for a prefetch request, an available cache block is an associated cache block based on the missed cache block.

An association is based on at least one of next-line prefetching, next-N-line prefetching, stride prefetching, stream prefetching, consecutive prefetching, sequential prefetching, correlated prefetching, and a direction based on either side of the missed cache block.

The at least one indicator includes an address associated with the missing cache block and a type of association.

The at least one indicator includes an address associated with the missing cache block and a memory address for each of the any available cache blocks.

The method further comprises determining if data stored in the cache is evictable; and storing the data received for each of the any available cache blocks in the cache upon eviction of corresponding data in the cache.

The cache miss is for a vector prefetch request, the missed cache block is vector prefetch request cache block including a starting cache block and related cache blocks, and the any available cache block includes a combination of an associated cache block based on the vector prefetch request cache block and a related cache block based on the vector prefetch request cache block.

An association is based on at least one of next-line prefetching, next-N-line prefetching, stride prefetching, stream prefetching, consecutive prefetching, sequential prefetching, correlated prefetching, and a direction based on either side of the vector prefetch request cache block.

The related cache block based on the vector prefetch request cache block is determined by: scanning, when there are available cache blocks, a missing address storage unit (MASU) related to the cache to determine the existence of a relationship between the vector prefetch request cache block and cache blocks associated with one or more entries in the MASU.

A relationship is based on at least one of next-line prefetching, next-N-line prefetching, stride prefetching, stream prefetching, consecutive prefetching, sequential prefetching, correlated prefetching, and a direction based on either side of the vector prefetch request cache block.

The cache is a last level cache.

In another aspect, in general, a method for differential cache block sizing includes determining, upon a vector prefetch request cache miss at a cache, a number of available cache blocks given a payload length of the main memory and a cache block size for the cache, scanning, when there are available cache blocks, a missing address storage unit (MASU) related to the cache to determine the existence of a relationship between a vector prefetch request cache block and cache blocks associated with one or more entries in the MASU, generating a main memory request including indicators for the vector prefetch request cache blocks, any related cache blocks, and any associated cache blocks, wherein a number of the any related cache blocks and a number any associated cache blocks are equal to the number of available cache blocks, sending the main memory request to the main memory to obtain data associated with the vector prefetch request cache blocks, any related cache blocks, and any associated cache blocks, storing the data received for the vector prefetch request cache blocks and any related cache blocks in the cache; and storing the data received for each of the any associated cache blocks in the cache depending on a cache replacement algorithm.

This and other aspects can include one or more of the following features.

An association is based on at least one of next-line prefetching, next-N-line prefetching, stride prefetching, stream prefetching, consecutive prefetching, sequential prefetching, correlated prefetching, and a direction based on either side of the missed cache block.

The indicators include an address associated with the missing cache block and a type of association.

Indicators include an address associated with the missing cache block and a memory address for each of the any available cache blocks.

The method further comprises: determining if data stored in the cache is evictable; and storing the data received for each of the any associated cache blocks in the cache upon eviction of corresponding data in the last level cache.

A relationship is based on at least one of next-line prefetching, next-N-line prefetching, stride prefetching, stream prefetching, consecutive prefetching, sequential prefetching, correlated prefetching, and a direction based on either side of the vector prefetch request cache block.

The cache is a last level cache.

In another aspect, in general, a computing system for differential cache block sizing includes a hierarchical memory system including multiple caches including a first cache, a prefetcher configured to generate and send prefetch requests towards the hierarchical memory system, and a cache control unit associated with the first cache. The cache control unit configured to determine, upon a cache miss, a number of available cache blocks given a payload length of the main memory and a cache block size for the first cache, generate a main memory request including at least one indicator for a missed cache block and any available cache blocks, send the main memory request to the main memory to obtain data associated with the missed cache block and each of the any available cache blocks, store the data received for the missed cache block in the first cache; and store the data received for each of the any available cache blocks in the first cache depending on a cache replacement algorithm.

This and other aspects can include one or more of the following features.

The cache miss is for a prefetch request, an available cache block is an associated cache block based on the missed cache block, and an association is based on at least one of next-line prefetching, next-N-line prefetching, stride prefetching, stream prefetching, consecutive prefetching, sequential prefetching, correlated prefetching, and a direction based on either side of the missed cache block.

The cache miss is for a vector prefetch request, the missed cache block is vector prefetch request cache block including a starting cache block and related cache blocks, and the any available cache block includes a combination of an associated cache block based on the vector prefetch request cache block and a related cache block based on the vector prefetch request cache block and an association is based on at least one of next-line prefetching, next-N-line prefetching, stride prefetching, stream prefetching, consecutive prefetching, sequential prefetching, correlated prefetching, and a direction based on either side of the vector prefetch request cache block.

The computing system further comprises: a missing address storage unit (MASU) associated with the first cache, wherein the missing address storage unit is configured to store a prefetch request which suffers a cache miss; and the cache control unit configured to: scan, when there are available cache blocks, the MASU to determine the existence of a relationship between the vector prefetch request cache block and cache blocks associated with one or more entries in the MASU, wherein a relationship is based on at least one of next-line prefetching, next-N-line prefetching, stride prefetching, stream prefetching, consecutive prefetching, sequential prefetching, correlated prefetching, and a direction based on either side of the vector prefetch request cache block.

The first cache is a last level cache.

Aspects can have one or more of the following advantages.

Processor cores support a defined cache block size which is optimal for cache packing and mitigating the effects of cache pollution. Main memory interfaces between a last level cache (LLC) and main memory support a defined cache block size which is optimal for utilizing the full available channel bandwidth or payload length of the main memory interface. Techniques described herein are useful for reconciling and processing of cache requests as between the LLC and main memory in a manner that supports efficient channel bandwidth utilization.

These and other aspects of this disclosure are disclosed in the following detailed description of the implementations, the appended claims and the accompanying figures.

BRIEF DESCRIPTION OF THE DRAWINGS

The disclosure is best understood from the following detailed description when read in conjunction with the accompanying drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

FIGS. 4A and 4B are examples of a MASU of FIG. 4 for implementing vector prefetching.

FIG. 10 is an example of a missing address storage unit.

DETAILED DESCRIPTION

Figure 1:
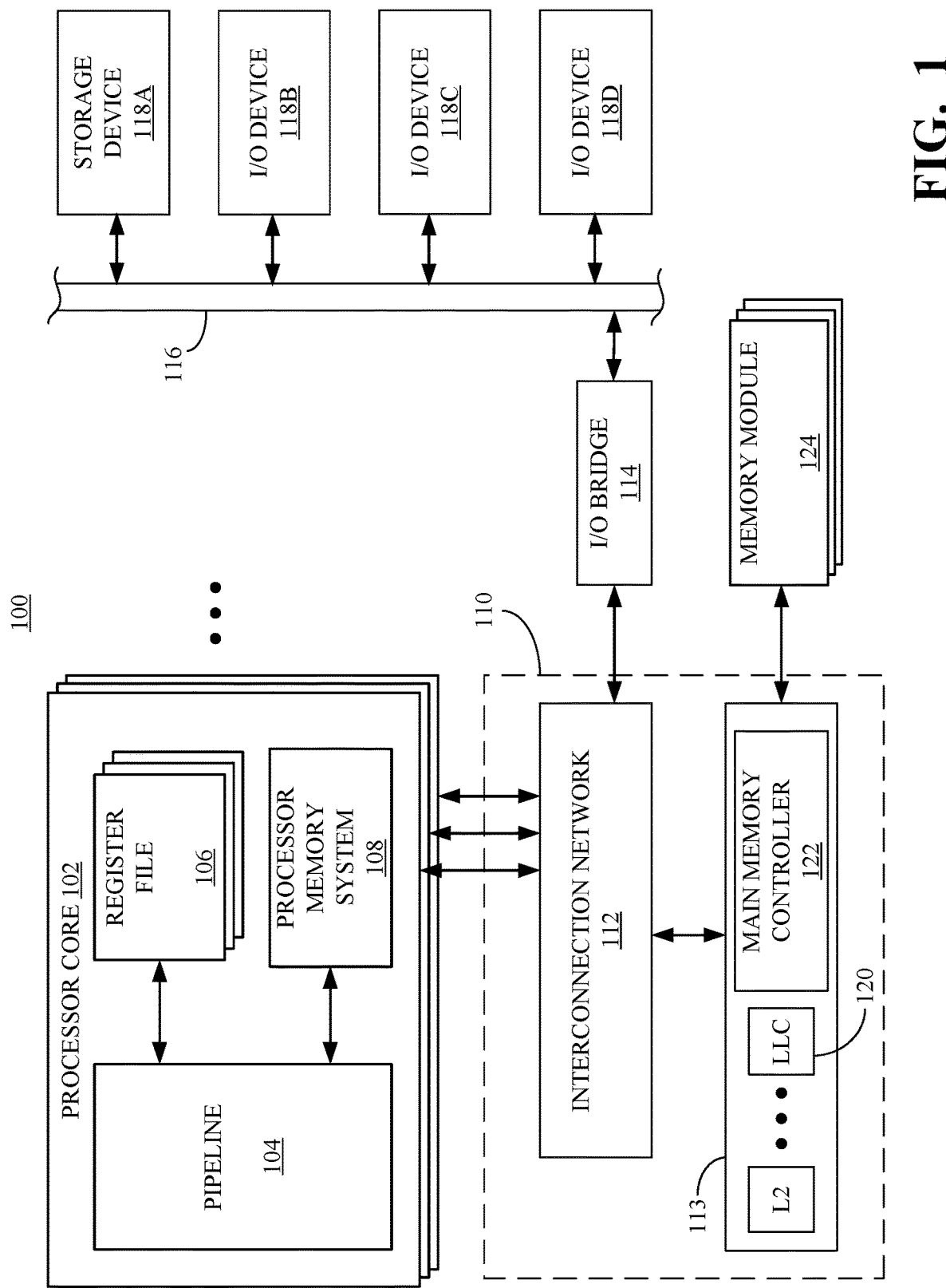
FIG. 1 is a high-level block diagram of an example of a computing system.

Described herein are apparatus, device, system, and methods for cache processing. FIGS. 1-10 discuss vector prefetching for computing systems and FIGS. 11-14 discuss differential cache block sizing for computing systems including usage of vector prefetching.

Outstanding cache misses at a lower level cache are stored in a missing address storage unit (MASU) (e.g., a miss address file (MAF), or any other storage and associated circuitry for storing and managing addresses of cache misses) for retrieval at a higher memory level (e.g., a higher level cache, or a main memory). FIG. 10 is an illustrate example which includes a L1 cache 1000, a L2 cache 1010, a L3 cache 1020, and a MASU 1030. The L1 cache 1000 and the L2 cache 1010 are inside or near a core and the L3 cache 1020 is outside the core, accessed via an interconnect network 1040, for example.

In this example, assume that the MASU 1030 holds entries for prefetch request or cache misses X, Y, Z, A, B, and C for the L2 cache 1010. For purposes of illustration, assume that the L2 cache 1010 is a multiple port device, where each port may generate a separate miss in the same cycle. If the L2 cache 1010 is a two port device, then the MASU 1030 may grow by as much as two memory access requests per cycle. Moreover, the MASU 1030 for the L2 cache 1010 in the core may be very large due to the latency involved in handling those cache misses in the L3 cache 1020, where the latency is due, in part, to the L3 cache 1020 having to be accessed over the interconnection network 1040. If the L3 cache 1020 is the last level cache (prior to accessing main memory (e.g., double data rate (DDR) memory)), then the latency for a MASU associated with the L3 cache 1020 is even larger (e.g., 10-50 cycles or more).

Moreover, the interconnection network 1040 between the core and the memory system may be running at a clock speed lower than the core. For example, if the interconnection network 1040 is running at half the speed of the core, then the interconnection network 1040 can only accept a prefetch request every other core cycle. For example, a core can issue two reads per cycle, but the interconnection network 1040 might accept one read per cycle from the core. Consequently, there might be a fundamental mismatch between core memory accesses and interconnect/memory accesses and the out-of-order cores can be constrained by how many commands can be issued to the interconnection network 1040 and memory system. The memory system may also be constrained by how many in-flight commands the memory system can hold (as limited by buffer size).

As noted, the interconnection network 1040 latency between the L2 cache 1010 and the L3 cache 1020 is a potential bottleneck for handling a backlog in the MASU 1030. The backlog may be due to a large number of memory requests being made in an out-of-order processor that tries aggressively to issue memory load requests ahead of time. Consequently, there may be more misses than in an in-order processor that waits to issue memory load requests until they appear in the correct program order. The backlog may also be due to prefetches to memory addresses that are predicted to be needed based on a recognized memory access pattern. If a sequence of addresses being requested is for a sequence of prefetches, for example, then a look-ahead for the prefetches could be selected to be relatively large to account for the latency of retrieving the address in the event of a miss in the L2 cache 1010 or a miss in both the L2 cache 1010 and the L3 cache 1020.

Processing of the outstanding cache misses in a missing address storage unit, such as a MASU, in an efficient manner is described herein.

Described herein are apparatus, device, system, and methods for vector prefetching. In an implementation, a vector prefetch unit scans non-issued entries in a MASU for prefetch requests which are associated or related prefetch requests (collectively "related"). In an implementation, associated or related prefetch requests may include next-line prefetching, next-N-line prefetching, stride prefetching, stream prefetching, consecutive prefetching, sequential prefetching, correlated prefetching, combinations thereof, and the like. The vector prefetch unit merges or coalesces the non-issued related prefetch requests in a single entry in the MASU and sends a vector prefetch request which merges the non-issued related prefetch requests into a single command, where the command includes a tuple <X,n> where X indicates a starting address and n indicates the number of additional cache blocks based on the related prefetch requests. In an implementation, the vector prefetch request may include multiple indicators including one indicator which indicates a starting address and another indicator which indicates the number of additional cache blocks. The vector prefetch unit may scan in response to a prefetch request, a periodic review, and/or a combination thereof.

The vector prefetching reduces the number of prefetch requests being sent, for example, over an interconnection network. A single prefetch request is sent in contrast to multiple prefetch requests. Moreover, the size of the single prefetch request is smaller as compared to sending a command and an address for each of n prefetch requests. The merged prefetch request uses a single command, a single address, and a number n indicating number of additional addresses being requested. The vector prefetching technique reduces the command bandwidth utilization and associated congestion on the interconnection network, and improves processor performance.

Figure 5:
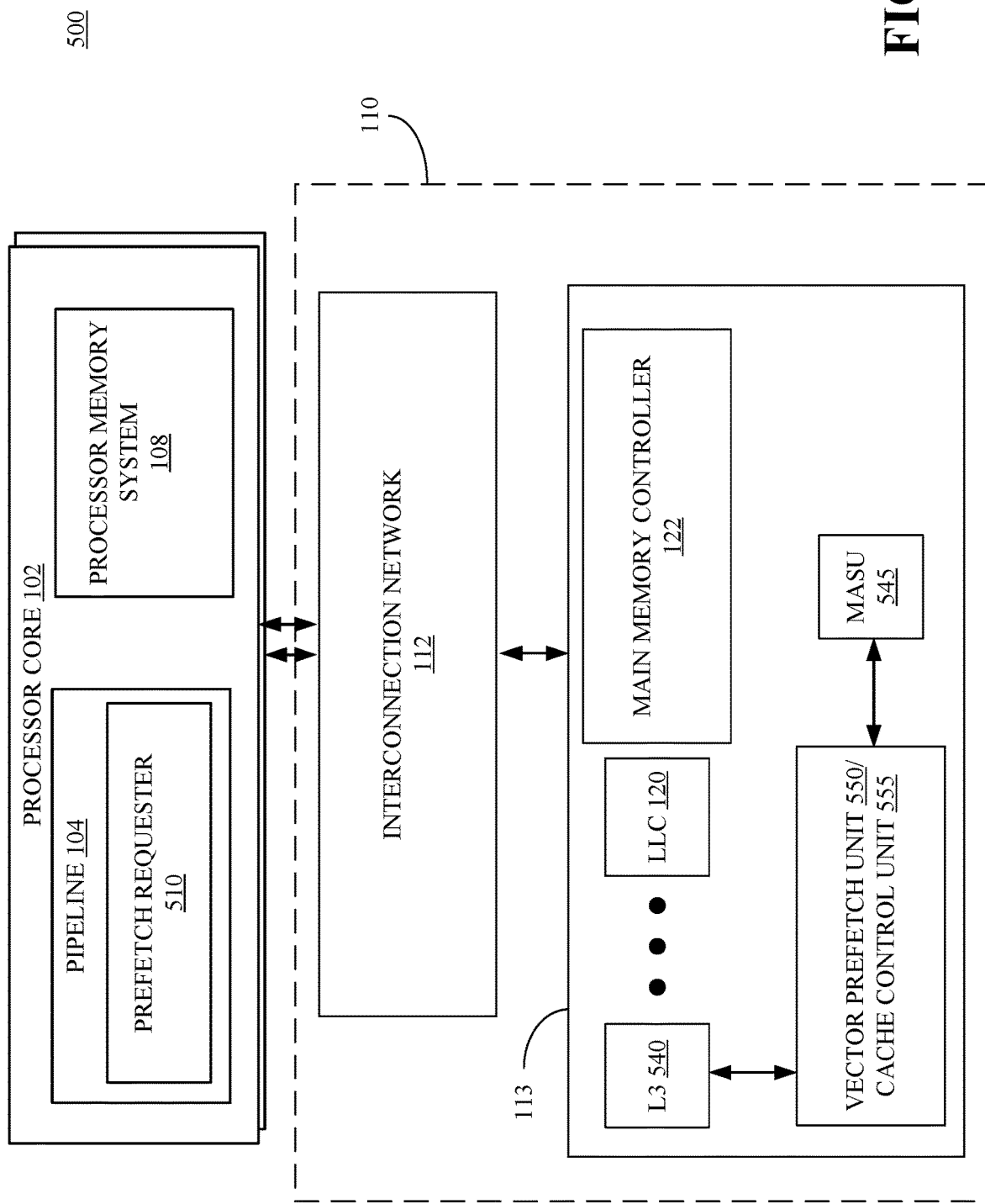
FIG. 5 is an example of a configuration of a computing system for implementing vector prefetching.
Figure 6:
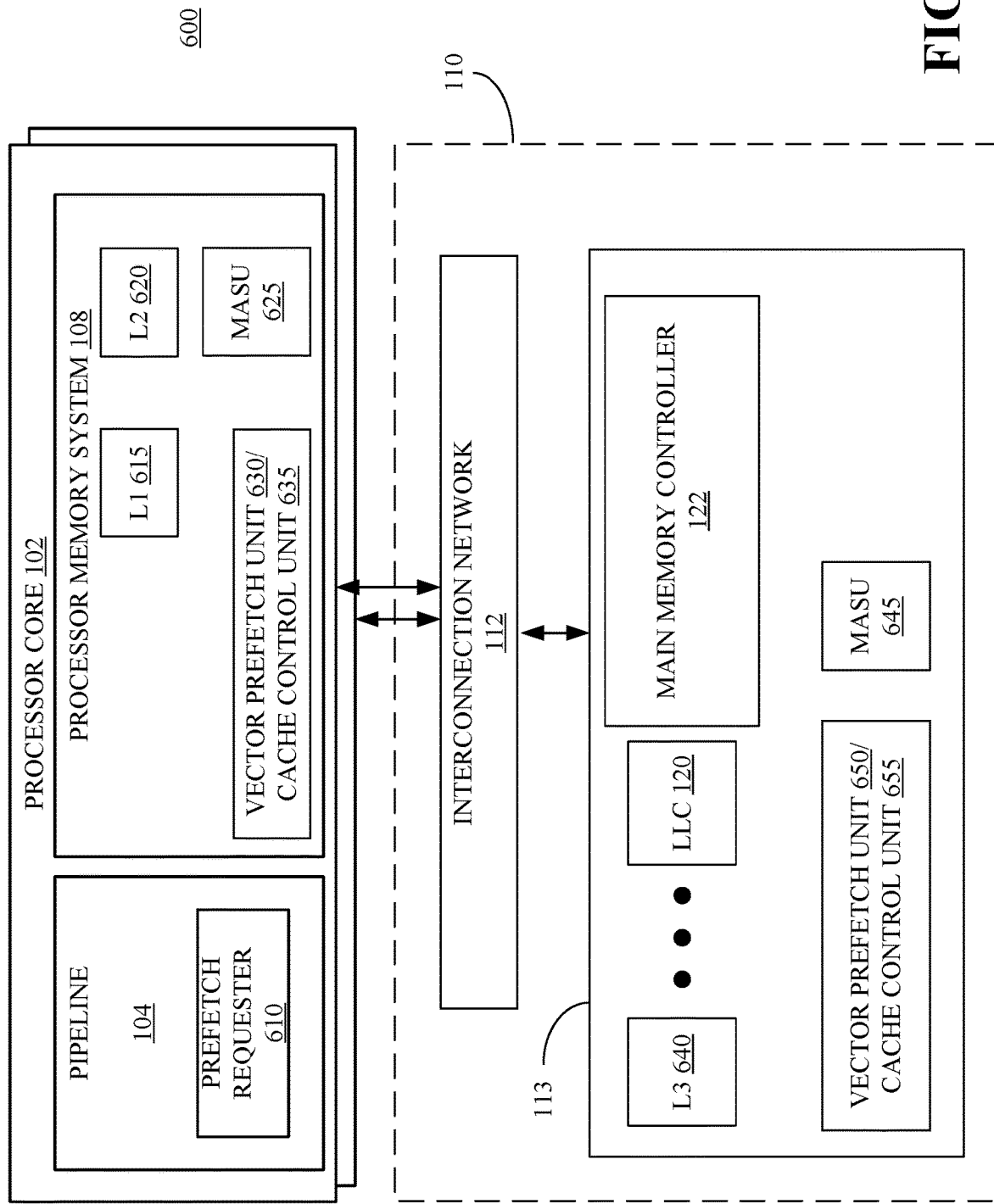
FIG. 6 is an example of a configuration of a computing system for implementing vector prefetching.
Figure 7:
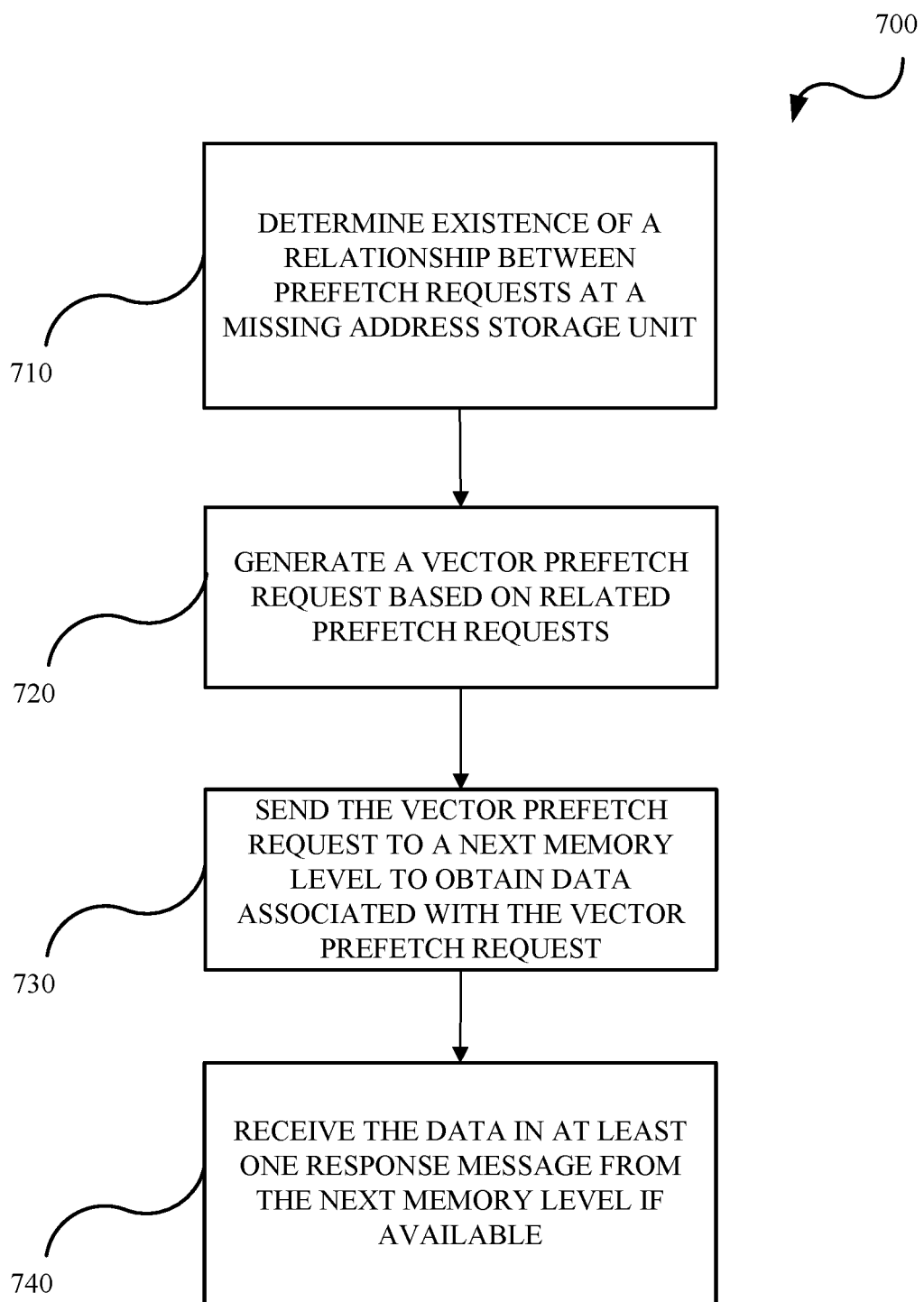
FIG. 7 is a flowchart of an example technique for vector prefetching.
Figure 8:
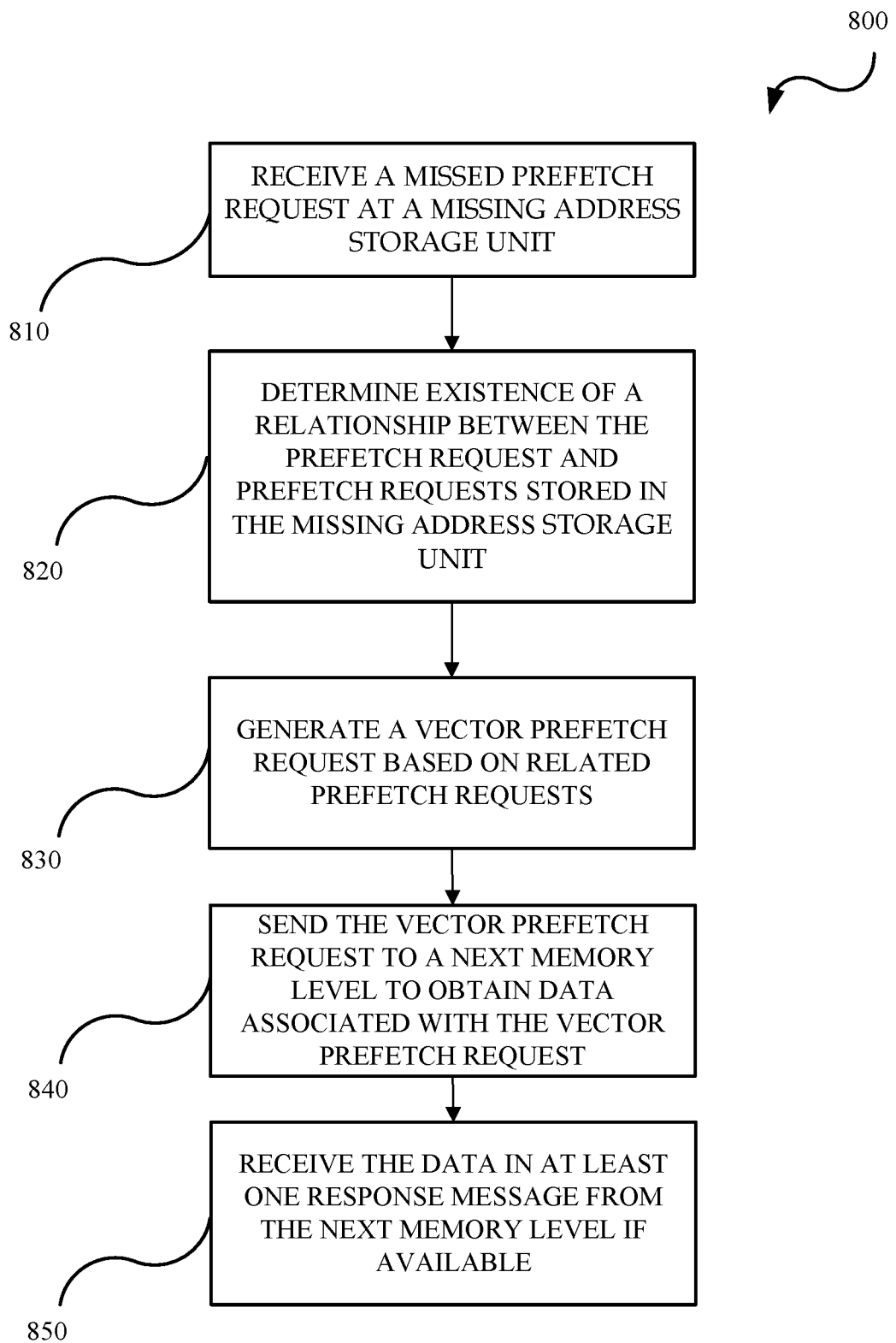
FIG. 8 is a flowchart of an example technique for vector prefetching.
Figure 9:
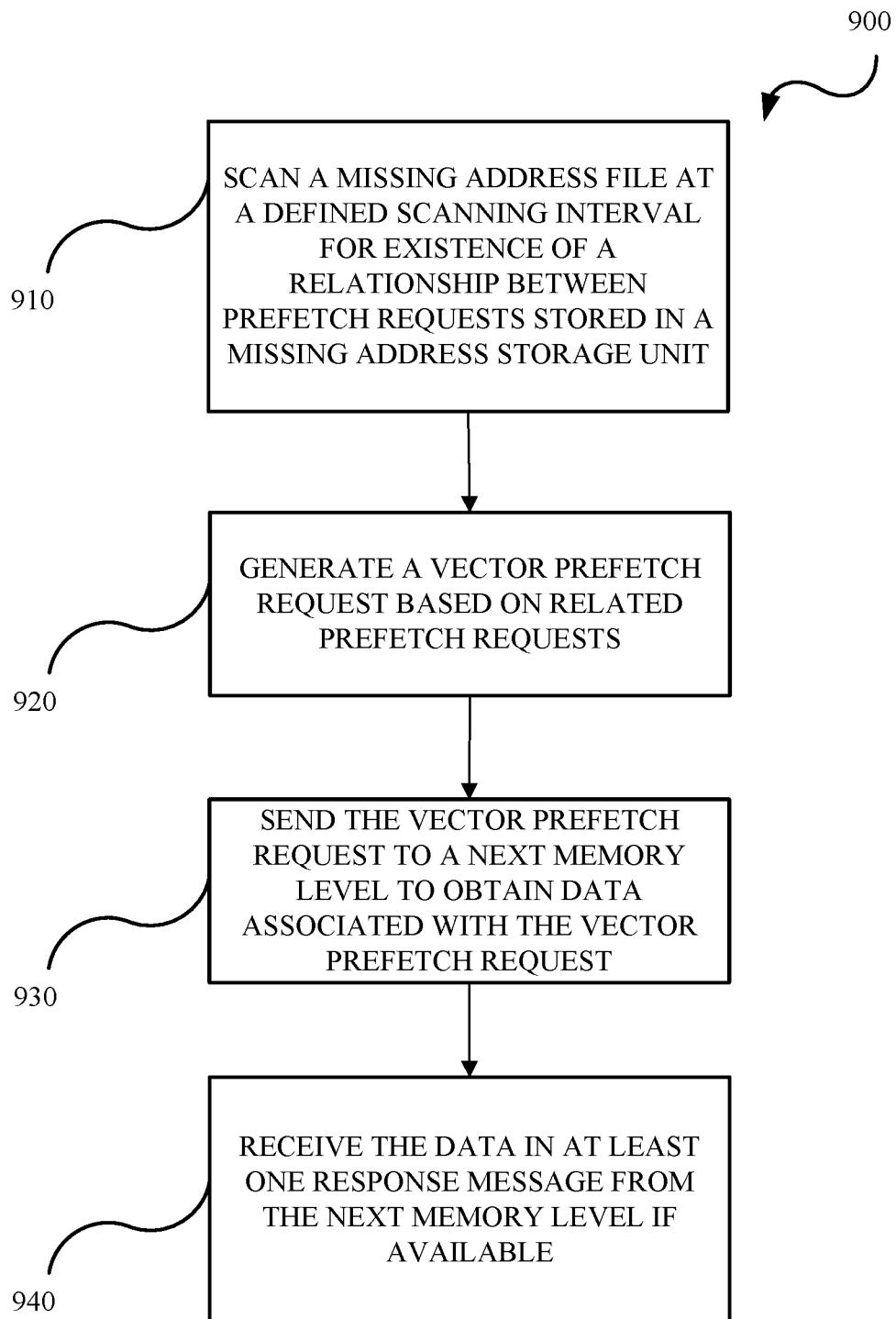
FIG. 9 is a flowchart of an example technique for vector prefetching.

Further details of techniques for vector prefetching in computing systems are described herein with reference to a system in which they can be implemented, as shown in FIGS. 1 through 6, and with reference to the methods as shown in FIGS. 7-9.

FIG. 1 is a high-level block diagram of an example of a computing system 100. The computing system 100 includes at least one processor core 102, which can be a single central processing unit (CPU) or one of multiple processor cores in a multi-core architecture. In a multi-core architecture, each processor core (or simply "core") can include an individual CPU with associated circuitry. In this example of a multi-core architecture, each processor core 102 can include a pipeline 104, one or more register files 106, and a processor memory system 108. Each register file of the register files 106 can include one or more individually addressable registers.

Each processor core 102 can be connected to an uncore 110. The uncore 110 can include an interconnection network 112 and an external memory system 113. The interconnection network 112 can be a bus, a cross-bar switch, a mesh network, or some other interconnection network. The interconnection network 112 can enable communication between each processor core 102 and an external memory system 113 and/or an input/output (I/O) bridge 114.

The I/O bridge 114 can enable communication, such as over an I/O bus 116, with various different I/O devices including a storage device 118A and other I/O devices 118B-118D. Non-limiting examples of the other I/O devices 118B-118D can include a network interface, a display adapter, or user input devices such as a keyboard or a mouse.

The storage device 118A can be a disk drive or some other large capacity storage device. The storage device 118A can typically be a non-volatile storage device. In some examples, the storage device 118A, or a portion thereof, can be used in a virtual memory scheme. For example, a portion of the storage device 118A can serve as secondary storage (or a 'backing store') in a virtual memory scheme for the (typically volatile and/or capacity-limited) main memory. Examples of main memory include the processor memory system 108 or an external memory system, such as described below with respect to an external memory system 113.

The processor memory system 108 and the external memory system 113 together form a hierarchical memory system. The hierarchy can include any number of levels. The levels may be denoted or referred to as L1, L2, . . . , LN. The L1 level is a lower level memory than the L2 memory system, which in turn is a lower level than the L3 memory system, and so on. Typically, each level of the hierarchical memory system can include memory (e.g., a memory system) that is slower to access than that of the immediately lower level and/or each level of the hierarchical memory system can include memory (e.g., a memory system) that is faster to access, more limited in capacity, and/or more expensive than that of a higher level. Each level of the hierarchical memory system can serve as a cache.

A first level (L1) cache can be within (e.g., a part of) the processor memory system 108. Any number of higher level (L2, L3, . . . ) caches can be within the external memory system 113. The highest (i.e., last) level cache within the external memory system 113 can be referred to as the last level cache (LLC). In an example, the LLC can be the L2 cache.

At each level, the cache can include a first module that provides an instruction cache for caching instructions and a second module that provides a data cache for caching data. The memory system of a level of the hierarchical memory system can load blocks of instructions or data into entries and evict (e.g., removes, over-writes, etc.) blocks of instructions or data from entries in units of cache blocks (also called cache lines). Cache lines are further described with respect to FIG. 3.

In addition to the L1 instruction cache and data cache, the processor memory system 108 can include a translation lookaside buffer (TLB) for caching recent translations, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104. The TLB is further described with respect to FIG. 3.

As already mentioned, the highest level cache within the external memory system 113 is the LLC (such as an LLC 120). The LLC 120 can be accessed (e.g., searched, etc.) just before main memory. Of course, this is only an example. The exact division between which level caches are within the processor memory system 108 and which are in the external memory system 113 can be different in other examples. For example, the L1 cache and the L2 cache can both be internal to the processor core 102 (i.e., part of the processor memory system 108) and the L3 (and higher) caches can be external to the processor core 102.

In an example, each processor core 102 can have its own internal L1 cache, and the processor cores can share an L2 cache. The external memory system 113 can also include a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

In a typical example, the content of a memory address is searched for in a level (e.g., L1) of the hierarchical memory system. If not found, then the next higher level (e.g., L2) is searched; and so on. Searching for a memory address amounts to answering the question: does this memory level of the hierarchical memory system include the content of the memory address? Or, alternatively, is the memory address cached in this memory of the hierarchical memory system?

That is, in a particular cache level of the hierarchy of the hierarchical memory system, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (i.e., read or write) the memory block from a higher level cache, or from the main memory (in the case of a miss in the LLC).

The pipeline 104 can include multiple stages through which instructions advance, a cycle at a time. The stages can include an instruction fetch (IF) stage or stages, an instruction decode (ID) stage or stages, an operand fetch (OF) stage or stages, an instruction execution (IE) stage or stages, and/or a write back (WB) stage or stages. The pipeline can include other stages, as further described with respect to FIG. 2. Some stages occur in a front-end portion of the pipeline. Some other stages occur in a back-end portion of the pipeline. The front-end portion can include pre-execution stages. The back-end portion of the pipeline can include execution and post-execution stages. The pipeline 104 is further described with respect to FIG. 2.

First, an instruction is fetched (e.g., in the IF stage or stages). An instruction can be fetched based on a program counter (PC). The PC is a pointer that can be used to identify instructions within memory (e.g., within a portion of the main memory, or within an instruction cache of the core 102). The PC can advance through addresses of a block of compiled instructions (called a "basic block"). The PC can be incremented by a particular number of bytes. The particular number of bytes for incrementing the PC can depend on how long (e.g., in bytes) each instruction is and on how many instructions are fetched at a time.

After being fetched, the instruction is then decoded (e.g., in the ID stage or stages) to determine an operation and one or more operands. Alternatively, in some pipelines, the IF and ID stages can overlap. If the instruction includes operands, the operands are fetched (e.g., in the OF stage or stages).

The instruction is then ready to be issued. Issuing an instruction starts progression of the instruction through stages in a back-end portion of the pipeline to execute the instruction. In an example, execution of the instruction can involve applying the operation of the instruction to the operand(s) to produce a result for an arithmetic logic unit (ALU) instruction. In an example, execution of the instruction can involve storing or loading to or from a memory address for a memory instruction. In an example, execution of the instruction can involve evaluating a condition of a conditional branch instruction to determine whether or not the branch should be taken.

After an instruction has completed execution, the instruction can be committed so that any effect of the instruction is made globally visible to software. Committing an instruction may involve storing a result in a register file (e.g., in the WB stage or stages), for example. In most implementations, even if any instructions were issued out-of-order, all instructions are generally committed in-order.

Figure 2:
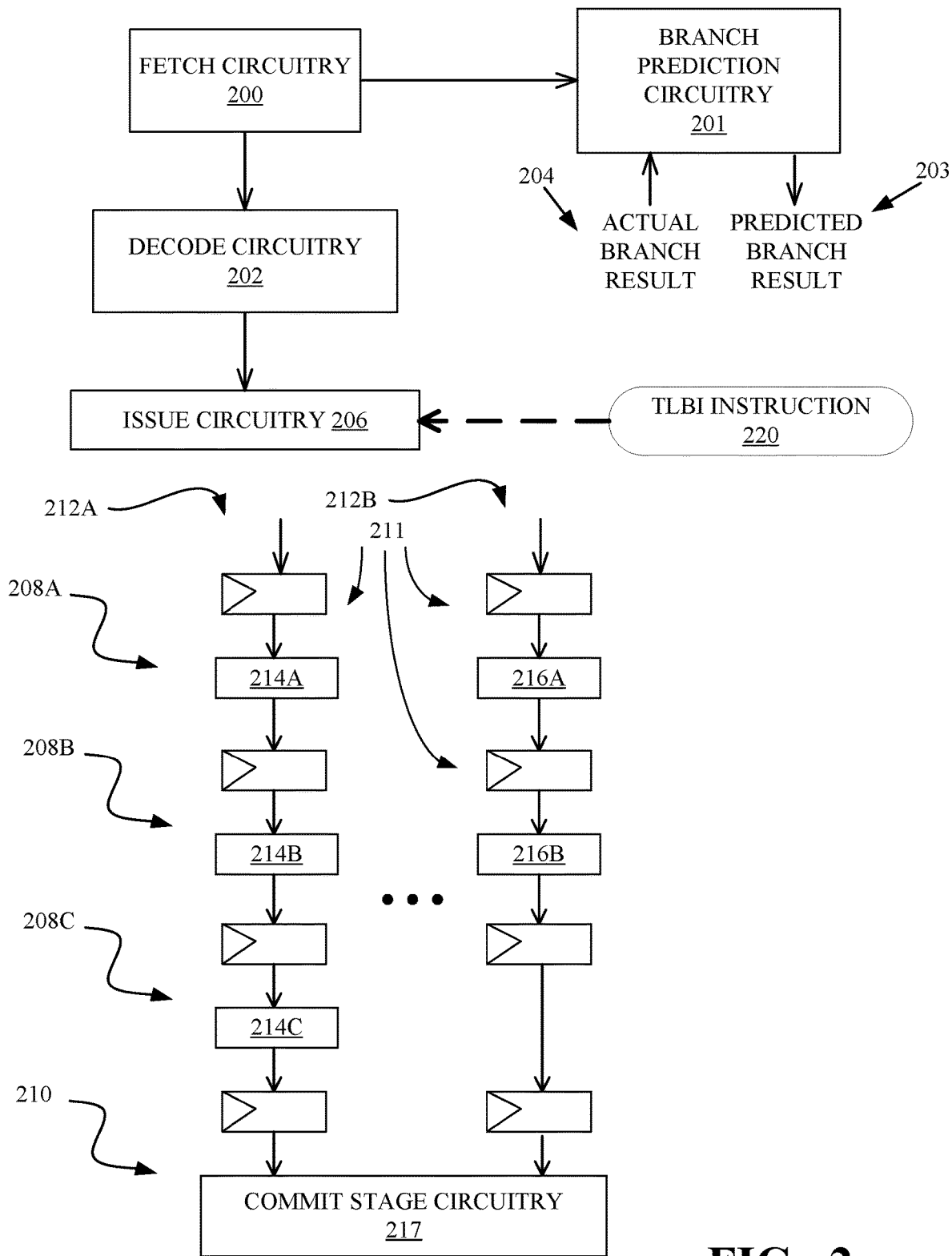
FIG. 2 is an example of a configuration of the pipeline of FIG. 1.

FIG. 2 is an example of a configuration of the pipeline 104 of FIG. 1.

The pipeline 104 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the pipeline 104. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the pipeline 104 to continue executing speculatively while an actual branch result 204 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an example of the out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 206 can determine a respective cycle in which each of the instructions in the issue queue are to be issued. Issuing an instruction makes the instruction available to progress through circuitry of instruction execution (IE) stages, such as a first execution stage 208A, a second execution stage 208B, and a third execution stage 208C, of the pipeline 104. For simplicity of explanation, only three execution stages are illustrated in FIG. 2. However, the disclosure herein is not so limited: more or fewer execution stages are possible.

The pipeline 104 can include one more commit stages, such as a commit stage 210. A commit stage commits (e.g., writes to memory) results of instructions that have made their way through the IE states 208A, 208B, and 208C. For example, a commit stage circuitry 217 may write back a result into a register file, such as the register file 106 of FIG. 1. However, some instructions may not be committed by the commit stage circuitry 217. Instead, the results of the instructions may be committed by other circuitry, such as circuitry in another stage of the back-end or a stage of the front-end, possibly based on information from the commit stage.

Between adjacent stages of the pipeline 104, the various paths through the pipeline circuitry include pipeline registers. For example, shown in FIG. 2 are pipeline registers 211 for the IE stages 208A, 208B, and 208C. The pipeline registers can be used for storing results of an upstream stage to be passed downstream to a next stage. The pipeline registers 211 may be clocked by (i.e., receive a clock signal derived from) a common clock (not shown). Thus, each clock cycle, each pipeline register 211 (also called a latch, or a set of flip-flops) can pass a result from its input to its output and becomes ready to receive a new result in its input after that result has been produced by the circuitry of that stage.

There may be multiple separate paths through the IE stages. The IE stages can include various circuitry for executing different types of instructions. For illustration purposes, only two paths 212A and 212B are shown in FIG. 2. However, the execution stages can include any number of paths with corresponding circuitry, which can be separated by pipeline registers, such as the pipeline registers 211.

The number of paths through the instruction execution stages can generally be dependent on the specific architecture. In an example, enough paths can be included such that a number of instructions up to a maximum number of instructions that can progress through the same execution stages in the same cycles. The maximum number of instructions that can progress through the same execution stages in the same cycles can be referred to as the issue width.

The number of stages that include functional circuitry for a given path may also differ. In the example of FIG. 2, a first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A and the second execution stage 208B, respectively. In the second path 212B, the third execution stage 208C is a "silo stage" that passes a result along without performing further computation thereby ensuring that each path passes through the same number of stages through the pipeline.

In an example, a path can include circuitry for executing instructions using units for various operations (e.g., ALU, multiplier, floating point unit, etc.). In an example, another path can include circuitry for executing memory access instructions. The memory access instructions can include load instructions that read data values from the memory system. The memory access instructions can include store instructions to write data values to the memory system. The circuitry for executing memory access instructions can also initiate translation of virtual addresses to physical addresses, when necessary, as described in more detail below with respect to FIG. 3.

In addition to branch prediction, as described with respect to the branch prediction circuitry 201, the pipeline 104 can be configured to perform other types of speculative execution. In an example of another type of speculative execution, the pipeline 104 can be configured to reduce the chance of stalling (such as in the event of a cache miss) by prefetching. Stalling refers to the situation in which processor execution of instructions is stopped/paused.

A prefetch request can be used to preload a cache level (e.g., of a data cache) so that a future memory request is likely to hit in that cache level instead of having to access a higher cache level or a main memory. For example, a speculative memory access request can include prefetch requests that are sent to preload an instruction cache or data cache based on a predicted access pattern.

A prefetch request can be or can include a software prefetch request such that an explicit prefetch instruction that is inserted into the pipeline 104 includes a particular address to be prefetched. A prefetch request can be or can include a hardware prefetch that is performed by hardware within the processor (e.g., the processor core 102) without an explicit prefetch instruction being inserted into its pipeline (e.g., the pipeline 104).

In some cases, prefetching can include recognizing a pattern (e.g., a stream) within the memory accesses of a program, or can include speculatively performing a load instruction within a program (e.g., using a speculative address for that load instruction) before that load instruction is actually issued as part of program execution.

Various types of external instructions can be received from other processor cores. Such externally received instructions can be inserted into the pipeline 104 by the issue circuitry 206 to be handled at the appropriate stage. An example of such an externally received instruction is a TLB invalidation (TLBI) instruction 220 for invalidating entries in the TLB of that particular processor core (i.e., the receiving core). Another example of an external instruction that can be received is a GlobalSync instruction, which may be broadcast to processor cores as a side effect of a memory barrier operation performed by a processor core to ensure that the effects of any previously broadcast TLBIs have been completed. Said another way, an originating processor core that issues a broadcast TLBI instruction can subsequently issue a data synchronization barrier (DSB) instruction, which in turn causes GlobalSync instructions to be received by every other processor core. In response to the GlobalSync instruction, when a receiving processor core completes the TLBI instruction, the receiving processor core sends, or causes to be sent, an acknowledgement to the originating process core. Once the originating process core receives acknowledgements from all receiving processor cores, the originating process core can proceed with instruction execution.

Figure 3:
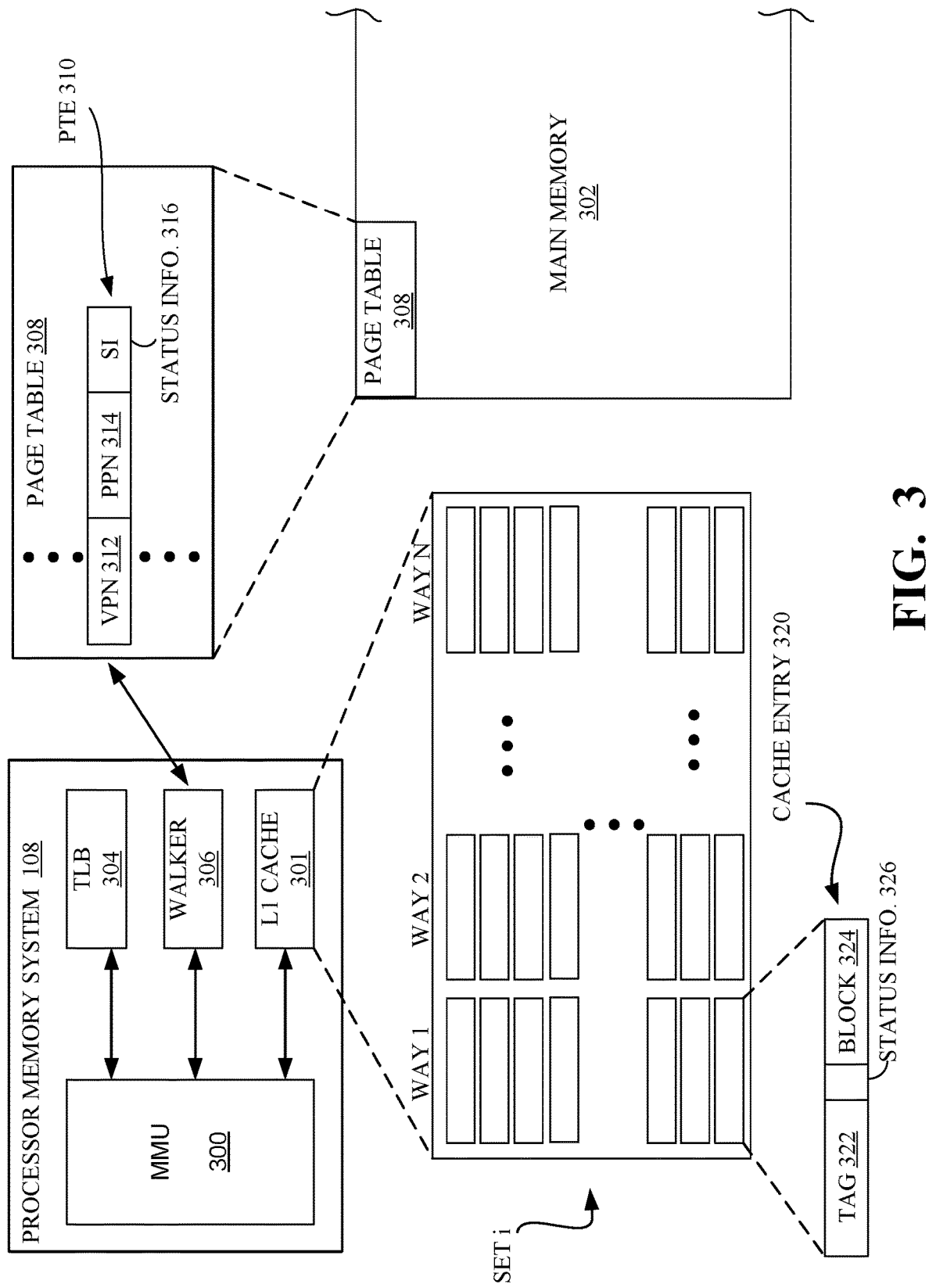
FIG. 3 is an example of a configuration of the processor memory system of FIG. 1.

FIG. 3 is an example of a configuration of the processor memory system 108 of FIG. 1. In example illustrated in FIG. 3, the processor memory system 108 includes a memory management unit (MMU) 300 that manages access to the memory system. The MMU 300 can manage the translation of virtual addresses to physical addresses.

In some implementations, the MMU 300 can determine whether a copy of a stored value (e.g., data or an instruction) at a given virtual address is present in any of the levels of the hierarchical cache system, such as in any of the levels from an L1 cache 301 up to the LLC 120 (FIG. 1) if necessary. If so, then the instruction accessing that virtual address can be executed using a cached copy of the value associated with that address. If not, then that instruction can be handled by miss circuitry to be executed after accessing the value from a main memory 302.

The main memory 302, and potentially one or more levels of the cache system, may need to be accessed using a physical address (PA) translated from the virtual address (VA). To this end, the processor memory system 108 can include a TLB 304 that stores translations, defined by VA-to-PA mappings, and a page table walker 306 for accessing a page table 308 if a translation is not found in the TLB 304. The translations stored in the TLB can include recently accessed translations, likely to be accessed translations, some other types of translations, or a combination thereof.

The page table 308 can store entries, including a page table entry (PTE) 310, that contain all of the VA-to-PA mappings currently in use. The page table 308 can typically be stored in the main memory 302 along with physical memory pages that represent corresponding mapped virtual memory pages that have been "paged in" from secondary storage (e.g., the storage device 118A of FIG. 1).

A memory page can include a number of cache blocks. A cache block can include a number of words. A word is of a predetermined number (e.g., 2) of bytes. A byte is a group of bits (e.g., 8 bits), which can be operated on as a unit. A byte can be considered a unit of memory size.

Alternatively, in a virtualized system with one or more guest operating systems managed by a hypervisor, virtual addresses (VAs) may be translated to intermediate physical addresses (IPAs), which are then translated to physical addresses (PAs). In a virtualized system, the translation by a guest operating system of VAs to IPAs may be handled entirely in software, or the guest operating system may have some hardware assistance from the MMU 300.

The TLB 304 can be used for caching recently accessed PTEs from the page table 308. The caching of recently accessed PTEs can enable the translation to be performed (such as in response to a load or a store instruction) without the page table walker 306 having to perform a potentially multi-level page table walk of a multiple-level data structure storing the page table 308 to retrieve the PTE 310. In an example, the PTE 310 of the page table 308 can store a virtual page number 312 and a physical page number 314, which together serve as a mapping between a VA and a PA that defines a translation of that VA.

An address (i.e., a memory address) can be a collection of bits. The bits of the memory address can be divided into low-order bits and high-order bits. For example, assuming 32-bit addresses, an example of a memory address is 01101001 00101000 00001101 01011100. The low-order bits are the rightmost 16 bits (i.e., 00001101 01011100); and the high-order bit are the leftmost 16 bits (i.e., 01101001 00101000). The low-order bits of a memory address can be used as a page offset. The low-order bits can be identical for a VA and its mapped PA. Thus, the high-order bits of a memory address can be used as a memory page number to specify the mapping.

The PTE 310 can also include status information (SI) 316. The SI 316 can indicate whether or not the page is resident in the main memory 302 or whether the page should be retrieved from secondary storage. When the PTE 310 is stored in an entry of any of the TLB 304, there may also be additional information for managing the transfer of PTEs between the page table 308 and the TLB 304, and for invalidating PTEs in the TLB 304. In an example, invalidating PTEs in the TLB 304 can be accomplished by toggling a bit (that indicates whether the entry is valid or not) to a state (i.e., a binary state) that indicates that the entry is invalid. However, other ways of invalidating PTEs are possible.

If a valid entry in the TLB 304 that matches with a portion of a VA to be translated is found (i.e., a "TLB hit"), then the PTE stored in that entry is used for translation. If there is no match (i.e., a "TLB miss"), then the page table walker 306 can traverse (or "walk") the levels of the page table 308 retrieve a PTE.

The L1 cache 301 can be implemented in any number of possible ways. In the implementation illustrated in FIG. 3, the L1 cache 301 is illustrated as being implemented as an N-way set associative cache module. Each cache entry 320 of the L1 cache 301 can include bits for storing a particular cache block 324 that has been copied from a physical page in the main memory 302 (possibly via higher level cache module).

The cache entry 320 can also include bits for storing a tag 322. The tag 322 can be made up of a number of the most significant bits of a virtual address, which are common to the words of that entry. For a virtually indexed, virtually tagged (VIVT) type of cache module, in addition to comparing a tag portion of a virtual address of desired data, the cache module can compare an index portion of the virtual address (which can be made up of middle bits between the tag and a block offset) to determine which of multiple sets may have a cache entry containing those desired data.

For an N-way set associative cache, the tag comparison can be performed N times (possibly in parallel) for the selected "set" (i). The comparison can be performed once for each of N "ways" in which a cache block containing the desired data may be stored.

The block offset can then be used to select a particular word from a cache block that is found in the cache entry (i.e., a 'cache hit'). If the tag does not match for any of the ways of the selected set (i.e., a 'cache miss'), then the cache system can attempt to retrieve the cache block from a higher level cache or from the main memory 302 (in the case of the LLC). The cache entry 320 can also include bits for storing status information 326. The status information 326 can include, for example, a valid bit and/or any flags or error correction bits.

When establishing a translation from a particular virtual address to a particular physical address or to an intermediate physical address, various types of context information can be used to distinguish otherwise identical virtual addresses from each other. The context information can enable multiple independent virtual address spaces to exist for different processes or different virtual machines or any of a variety of other differentiating characteristics that support different virtual address spaces.

Various portions of the context information can be used for differentiating between virtual addresses that are in use within different VA-to-PA translations, or in the case that intermediate physical addresses (IPAs) are used, VA-to-IPA translations, or IPA-to-PA translations.

For example, an operating system can use an address space identifier (ASID) (e.g., 16 bits) to identify a memory space (a virtual address space) associated with a running process. A hypervisor can use a virtual machine identifier (VMID) (e.g., 16 bits) to identify a memory space (i.e., an intermediate physical address space) associated with a guest operating system of a virtual machine.

Certain parameters can be associated with different classes of processes or software environments that are available in an architecture, such as a security state with values of secure (S) or non-secure (NS), or an exception level (also called a 'priority level') with values of EL0-EL3 (for a 2-bit exception level), for example.

All or a subset of this context information together constitute a context (also called a "translation context" or a "software context") for a particular virtual address.

A context identifier (CID) can represent either the full context information or partial context information. In some architectures, for example, the full context information can include 35 bits: a 2-bit exception level (EL), a 1-bit non-secure/secure (NS/S) value, a 16-bit VMID, and a 16-bit ASID.

It is to be noted, though, that there can potentially be significant overhead in terms of integrated circuit area devoted to the storage for the data structure that tracks validity for different CIDs. To reduce the overhead, the CID can include partial context information, such as only the 16-bit VMID and the 2-bit EL. Such partial context information can uniquely identify different subsets of contexts. Alternatively, instead of simply concatenating subsets of bits from the full context information, techniques can be used to essentially compress full context information into fewer bits. For example, circuitry that computes the CIDs can be configured to include fewer bits than the full context information, where those bits can be assigned based on a stored mapping between CIDs and a corresponding full context information string.

While the mapping itself takes space on the integrated circuit, more space can be saved in the data structure that tracks validity of different active CIDs. Additional details about techniques for compressing context information can be found, for example, in U.S. Pat. No. 9,779,028, entitled "MANAGING TRANSLATION INVALIDATION," which is incorporated herein by reference.

Figure 4:
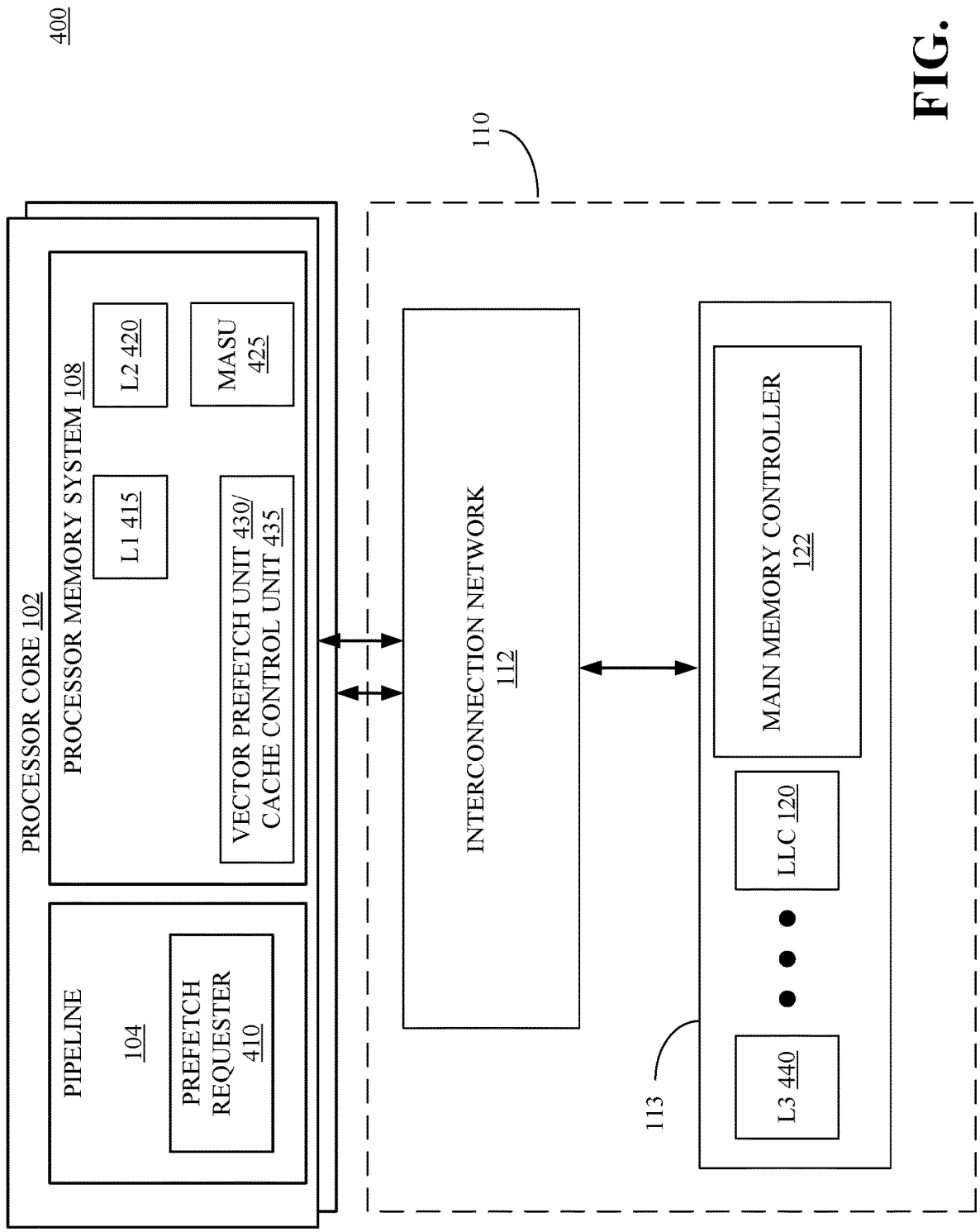
FIG. 4 is an example of a configuration of a computing system for implementing vector prefetching.

FIG. 4 is an example of a computing system 400 for implementing vector prefetching. The computing system 400 includes the elements and functionality as described for FIGS. 1-3 in addition to the elements and functionality described herein. The processor core 102 includes a pipeline 104 and a processor memory system 108. The pipeline 104 of the computing system 400 includes a prefetch requester 410 which provides or submits prefetch requests to the processor memory system 108, where each prefetch request is associated with a memory address. The processor memory system 108 of the computing system 400 includes a L1 cache 415, a L2 cache 420, a MASU 425, and a vector prefetch unit 430. The MASU 425 is provided between the L1 cache 415 and the L2 cache 420 to capture or store cache misses at the L1 cache 415 for retrieval at the L2 cache 420. The MASU 425 has a defined number of entries. For example, a MASU 425 can have 48 entries. The MASU 425 is stored in a memory structure close to but separate from the memory structure that stores the L1 cache 415. In an implementation, the vector prefetch unit 430 may be integrated with or into a cache controller unit (CCU) 435 and the description herein for the vector prefetch unit 430 is equally applicable to the CCU 435. The number of caches present in the processor memory system 108 is illustrative.

The processor core 102 is in communication with the uncore 110. The uncore 110 includes the interconnection network 112 and the external memory system 113. The external memory system 113 includes a L3 cache 440, the LLC 120, and the main memory controller 122.

FIGS. 4A and 4B are examples of the MASU 425 of FIG. 4 for implementing vector prefetching in an illustrative example. Referring now to both FIGS. 4 and 4A, assume that a cache block size is CB in bytes, for example. Assume the prefetch requestor 410 sends a prefetch request for address X. The prefetch request for address X is a cache miss with respect to the L1 cache 415, is processed appropriately, and is a cache miss with respect to the L2 cache 420. The missed prefetch request for address X is stored in an entry in the MASU 425 as shown in FIG. 4A. The prefetch requestor 410 sends a prefetch request for address X+CB. The prefetch request for address X+CB is a cache miss with respect to the L1 cache 415, is processed appropriately, and is a cache miss with respect to the L2 cache 420. The vector prefetch unit 430 determines that there is a relationship between the prefetch request for address X+CB and the prefetch request for address X and merges both prefetch requests into one entry in the MASU 425 as shown in FIG. 4B. This merger processing assumes that the prefetch request for address X has not yet been issued. The vector prefetch unit 430 will issue the merged prefetch requests as a vector prefetch request which consists of the tuple: <X, n> where X indicates the starting address or cache block and n indicates the number of related cache blocks (assuming non-issuance) or multiple indicators indicating a starting address and indicating the number of additional cache blocks. In the illustrative example, the vector prefetch unit 430 will send the vector prefetch request over the interconnection network 112 to the external memory system 113 to obtain the data at the memory addresses or cache blocks identified in the tuple or by the indicators.

The returning entity can return X and X+n in a single response message or in multiple response messages. For example, in the illustrative example, the external memory system 113 can return a single response message for X and X+CB or a first response message with X and a second response message with X+CB.

In an implementation, the number of related cache blocks, n, that can be sent in a vector prefetch request is variable, where n is dependent on the size of the field or number of bits allocated to n.

In an implementation, the vector prefetch unit 430 determines relationships between prefetch requests based on next-line prefetching, next-N-line prefetching, stride prefetching, stream prefetching, consecutive prefetching, sequential prefetching, correlated prefetching, adjacency prefetching, combinations thereof, and the like relationships.

In an implementation, the vector prefetch unit 430 determines relationships when a prefetch request arrives at a MASU. In an implementation, the vector prefetch unit 430 determines relationships based on a periodic scan of a MASU. In an implementation, the vector prefetch unit 430 determines relationships after waiting a defined number of cycles and scans the MASU to determine merger opportunities. In an implementation, the vector prefetch unit 430 determines relationships based on a combination of arriving prefetches, periodic scans, waiting a defined number of cycles, and like methods.

In an implementation, the search of the MASU can be performed based on the kind of memory structure storing the MASU. In an implementation, if the MASU is stored in a content-addressable memory (CAM), the value of the address can be lower (or higher) than the address being requested and can be searched efficiently to determine whether coalescing opportunities exist.

In an implementation, the prefetch requests can come from one or more cores, processors, and the like.

In an implementation, a MASU may be provided between any two caches and the vector prefetch unit or cache control unit can perform vector prefetching accordingly. In an implementation, a MASU may be partitioned for association with different pairings of caches. In an implementation, vector prefetching can be done at every MASU in the computing system.

FIG. 5 is an example of a computing system 500 for implementing vector prefetching. In an implementation, components of the computing system 500 may be provided as upgrades or additions to the computing system 500 to provide vector prefetching.

The computing system 500 includes the elements and functionality as described for FIGS. 1-3 in addition to the elements and functionality described herein. The processor core 102 includes a pipeline 104 and a processor memory system 108. The pipeline 104 of the computing system 500 includes a prefetch requester 510 which provides or submits prefetch requests to the processor memory system 108, where each prefetch request is associated with a memory address.

The processor core 102 is in communication with the uncore 110. The uncore 110 includes the interconnection network 112 and the external memory system 113. The external memory system 113 includes a L3 cache 540, a MASU 545, a vector prefetch unit 550, the LLC 120, and the main memory controller 122. In an illustrative example, the MASU 545 is provided between the L3 cache 540 and the LLC cache 120 to capture or store cache misses at the L3 cache 540 for retrieval at the LLC cache 120. The MASU 545 has a defined number of entries. For example, a MASU 545 can have 48 entries. The MASU 545 is stored in a memory structure close to but separate from the memory structure that stores the L3 cache 540. In an implementation, the vector prefetch unit 550 may be integrated with or into a cache controller unit (CCU) 555 and the description herein for the vector prefetch unit 550 is equally applicable to the CCU 555. The number of caches present in the external memory system 113 is illustrative.

Operationally, vector prefetching functions similarly as described with respect to FIGS. 4, 4A and 4B. The prefetch requestor 510 sends a prefetch request for address X. The prefetch request for address X is a cache miss with respect to caches present in the processor memory system 108, processed appropriately, and is a cache miss with respect to L3 cache 540. The missed prefetch request for address X is stored in an entry in the MASU 545. The prefetch requestor 410 sends a prefetch request for address X+CB. The prefetch request for address X+CB is a cache miss with respect to caches present in the processor memory system 108, processed appropriately, and is a cache miss with respect to L3 cache 540. The vector prefetch unit 550 determines that there is a relationship between the prefetch request for address X+CB and the prefetch request for address X and merges both prefetch requests into one entry in the MASU 545. This merger processing assumes that the prefetch request for address X has not yet been issued. The vector prefetch unit 550 will issue the merged prefetch requests as a vector prefetch request which consists of the tuple: <X, n> where X indicates the starting address or cache block and n indicates the number of related cache blocks (assuming non-issuance). In the illustrative example, the vector prefetch unit 550 will send the vector prefetch request to the LLC cache 120 to obtain the data at the memory addresses or cache blocks identified in the tuple. In an implementation, multiple indicators may be used as described herein, The returning entity can return X and X+n in a single response message or in multiple response messages. For example, in the illustrative example, the LLC cache 120 can return a single response message for X and X+CB or a first response message with X and a second response message with X+CB.

In an implementation, the number of related cache blocks, n, that can be sent in a vector prefetch request is variable, where n is dependent on the size of the field or number of bits allocated to n.

In an implementation, the vector prefetch unit 550 determines relationships between prefetch requests based on next-line prefetching, next-N-line prefetching, stride prefetching, stream prefetching, consecutive prefetching, sequential prefetching, correlated prefetching, adjacency prefetching, combinations thereof, and the like relationships.

In an implementation, the vector prefetch unit 550 determines relationships when a prefetch request arrives at a MASU. In an implementation, the vector prefetch unit 550 determines relationships based on a periodic scan of a MASU. In an implementation, the vector prefetch unit 430 determines relationships after waiting a defined number of cycles and scans the MASU to determine merger opportunities. In an implementation, the vector prefetch unit 550 determines relationships based on a combination of arriving prefetches, periodic scans, waiting a defined number of cycles, and like methods.

In an implementation, the search of the MASU can be performed based on the kind of memory structure storing the MASU. In an implementation, if the MASU is stored in a content-addressable memory (CAM), the value of the address can be lower (or higher) than the address being requested and can be searched efficiently to determine whether coalescing opportunities exist.

In an implementation, the prefetch requests can come from one or more cores, processors, and the like. In an implementation, the external memory system 113 may be shared by one or more cores, processors, and the like. In an implementation, vector prefetching can be done at every MASU in the computing system.

In an implementation, a MASU may be provided between any two caches and the vector prefetch unit or cache control unit can perform vector prefetching accordingly. In an implementation, a MASU may be partitioned for association with different pairings of caches. In an implementation, the MASU may be provided between the LLC cache 120 and a memory module, such as memory module 124 to capture or store cache misses at the LLC cache 120 for retrieval at the memory module.

FIG. 6 is an example of a computing system 600 for implementing vector prefetching. In an implementation, components of the computing system 600 may be provided as upgrades or additions to the computing system 600 to provide vector prefetching.

The computing system 600 includes the elements and functionality as described for FIGS. 1-3 in addition to the elements and functionality described herein. The processor core 102 includes a pipeline 104 and a processor memory system 108. The pipeline 104 of the computing system 600 includes a prefetch requester 610 which provides or submits prefetch requests to the processor memory system 108, where each prefetch request is associated with a memory address. The processor memory system 108 of the computing system 600 includes a L1 cache 615, a L2 cache 620, a MASU 625, and a vector prefetch unit 630. The MASU 625 is provided between the L1 cache 615 and the L2 cache 620 to capture or store cache misses at the L1 cache 615 for retrieval at the L2 cache 620. The MASU 625 has a defined number of entries. For example, a MASU 625 can have 48 entries. The MASU 625 is stored in a memory structure close to but separate from the memory structure that stores the L1 cache 615. In an implementation, the vector prefetch unit 630 may be integrated with or into a cache controller unit (CCU) 635 and the description herein for the vector prefetch unit 630 is equally applicable to the CCU 635. The number of caches present in the processor memory system 108 is illustrative.

The processor core 102 is in communication with the uncore 110. The uncore 110 includes the interconnection network 112 and the external memory system 113. The external memory system 113 includes a L3 cache 640, a MASU 645, a vector prefetch unit 650, the LLC 120, and the main memory controller 122. In an illustrative example, the MASU 645 is provided between the L3 cache 640 and the LLC cache 120 to capture or store cache misses at the L3 cache 640 for retrieval at the LLC cache 120. The MASU 645 has a defined number of entries. For example, a MASU 645 can have 48 entries. The MASU 645 is stored in a memory structure close to but separate from the memory structure that stores the L3 cache 640. In an implementation, the vector prefetch unit 650 may be integrated with or into a cache controller unit (CCU) 655 and the description herein for the vector prefetch unit 650 is equally applicable to the CCU 655. The number of caches present in the external memory system 113 is illustrative.

Operationally, vector prefetching functions similarly as described with respect to FIGS. 4, 4A, 4B and 5. The prefetch requestor 610 sends a prefetch request for address X. The prefetch request for address X is a cache miss with respect to the L1 cache 615, is processed appropriately, and is a cache miss with respect to the L2 cache 620. The missed prefetch request for address X is stored in an entry in the MASU 625. The prefetch requestor 610 sends a prefetch request for address X+CB. The prefetch request for address X+CB is a cache miss with respect to the L1 cache 615, is processed appropriately, and is a cache miss with respect to the L2 cache 620. The vector prefetch unit 630 determines that there is a relationship between the prefetch request for address X+CB and the prefetch request for address X and merges both prefetch requests into one entry in the MASU 625. The vector prefetch unit 630 will issue the merged prefetch requests as a vector prefetch request which consists of the tuple: <X, n> where X indicates the starting address or cache block and n indicates the number of related cache blocks (assuming non-issuance). The vector prefetch unit 630 will send the vector prefetch request with a tuple over the interconnection network 112 to the external memory system 113 to obtain the data at the memory addresses or cache blocks identified in the tuple. In an implementation, multiple indicators may be used as described herein, The vector prefetch request is a cache miss with respect to L3 cache 640. The vector prefetch unit 650 determines that there is a relationship between the vector prefetch request and a previous prefetch request in an entry in the MASU 645 and merges the vector prefetch request and the previous prefetch request into one entry in the MASU 645. This merger processing assumes that the previous prefetch has not yet been issued. The vector prefetch unit 650 will issue the merged prefetch requests as a further vector prefetch request. In the illustrative example, the vector prefetch unit 650 will send the further vector prefetch request to the LLC cache 120 to obtain the data at the memory addresses or cache blocks identified in the tuple. In an implementation, multiple indicators may be used as described herein, The returning entity can return X and X+n in a single response message or in multiple response messages. For example, in the illustrative example, the LLC cache 120 can return a single response message for X and X+CB or a first response message with X and a second response message with X+CB.

In an implementation, the number of related cache blocks, n, that can be sent in a vector prefetch request is variable, where n is dependent on the size of the field or number of bits allocated to n.

In an implementation, the vector prefetch unit 650 determines relationships between prefetch requests based on next-line prefetching, next-N-line prefetching, stride prefetching, stream prefetching, consecutive prefetching, sequential prefetching, correlated prefetching, adjacency prefetching, combinations thereof, and the like relationships.

In an implementation, the vector prefetch unit 650 determines relationships when a prefetch request arrives at a MASU. In an implementation, the vector prefetch unit 550 determines relationships based on a periodic scan of a MASU. In an implementation, the vector prefetch unit 430 determines relationships after waiting a defined number of cycles and scans the MASU to determine merger opportunities. In an implementation, the vector prefetch unit 650 determines relationships based on a combination of arriving prefetches, periodic scans, waiting a defined number of cycles, and like methods.

In an implementation, the search of the MASU can be performed based on the kind of memory structure storing the MASU. In an implementation, if the MASU is stored in a content-addressable memory (CAM), the value of the address can be lower (or higher) than the address being requested and can be searched efficiently to determine whether coalescing opportunities exist.

In an implementation, the prefetch requests can come from one or more cores, processors, and the like. In an implementation, the external memory system 113 may be shared by one or more cores, processors, and the like. In an implementation, vector prefetching can be done at every MASU in the computing system.

In an implementation, a MASU may be provided between any two caches and the vector prefetch unit or cache control unit can perform vector prefetching accordingly. In an implementation, a MASU may be partitioned for association with different pairings of caches. In an implementation, the MASU may be provided between the LLC cache 120 and a memory module, such as memory module 124 to capture or store cache misses at the LLC cache 120 for retrieval at the memory module.

FIG. 7 is a flowchart of an example method 700 for vector prefetching in accordance with embodiments of this disclosure. The method 700 includes: determining 710 existence of a relationship between prefetch requests at a missing address storage unit; generating 720 a vector prefetch request based on related prefetch requests; sending 730 the vector prefetch request to a next memory level to obtain data associated with the vector prefetch request; and receiving 740 the data in at least one response message from the next memory level if available. The method 700 may be implemented, as appropriate and applicable, by the computing system 400 of FIG. 4, the computing system 500 of FIG. 5, and the computing system 600 of FIG. 6.

The method 700 includes determining 710 existence of a relationship between prefetch requests at a missing address storage unit. In an implementation, a vector prefetch unit or cache control unit determines if there are any relationships between an incoming prefetch request and prefetch request miss entries in a MASU. In an implementation, a vector prefetch unit or cache control unit determines if there are any relationships between prefetch request miss entries in a MASU after a defined interval. In an implementation, the relationship can be based on next-line prefetching, next-N-line prefetching, stride prefetching, stream prefetching, consecutive prefetching, sequential prefetching, correlated prefetching, combinations thereof, and the like.

The method 700 includes generating 720 a vector prefetch request based on related prefetch requests. The vector prefetch request is a message or command which includes a tuple identifying a starting memory address or cache block and the number of additional memory addresses or cache blocks. In an implementation, the tuple includes a directional bit(s) to handle memory addresses or cache blocks on either side of the starting memory address or cache block. In an implementation, the tuple includes an offset pattern bit(s) to handle memory addresses or cache blocks which are based on multiple offsets of the starting memory address or cache block. In an implementation, multiple indicators may be used, The method 700 includes sending 730 the vector prefetch request to a next memory level to obtain data associated with the vector prefetch request. The vector prefetch request is sent to a cache higher than the cache associated with the MASU. In an implementation, the vector prefetch request is sent to memory higher than the cache associated with the MASU.

The method 700 includes receiving 740 the data in at least one response message from the next memory level if available. The data or contents associated with the memory addresses are sent back by the next memory level if available. In the event of a cache miss, the vector prefetch request may go through the vector prefetching process again with a MASU of the next memory level.

FIG. 8 is a flowchart of an example method 800 for vector prefetching in accordance with embodiments of this disclosure. The method 800 includes: receiving 810 a missed prefetch request at a missing address storage unit; determining 820 existence of a relationship between the prefetch request and prefetch requests stored in the missing address storage unit; generating 830 a vector prefetch request based on related prefetch requests; sending 840 the vector prefetch request to a next memory level to obtain data associated with the vector prefetch request; and receiving 850 the data in at least one response message from the next memory level. The method 800 may be implemented, as appropriate and applicable, by the computing system 400 of FIG. 4, the computing system 500 of FIG. 5, and the computing system 600 of FIG. 6.

The method 800 includes receiving 810 a missed prefetch request at a missing address storage unit. A prefetch request is received at a cache and in the event there is a cache miss, the prefetch request is processed for saving in a MASU associated with the cache.

The method 800 includes determining 820 existence of a relationship between prefetch requests at a missing address storage unit. A vector prefetch unit or cache control unit checks the memory address of the missed prefetch request against the memory addresses of previously stored and non-issued prefetch requests. In an implementation, the relationship can be based on next-line prefetching, next-N-line prefetching, stride prefetching, stream prefetching, consecutive The method 800 includes generating 830 a vector prefetch request based on related prefetch requests. The vector prefetch request is a message or command which includes a tuple identifying a starting memory address or cache block and the number of additional memory addresses or cache blocks. In an implementation, the tuple includes a directional bit(s) to handle memory addresses or cache blocks on either side of the starting memory address or cache block. In an implementation, the tuple includes an offset pattern bit(s) to handle memory addresses or cache blocks which are based on multiple offsets of the starting memory address or cache block. In an implementation, multiple indicators may be used, The method 800 includes sending 840 the vector prefetch request to a next memory level to obtain data associated with the vector prefetch request. The vector prefetch request is sent to a cache higher than the cache associated with the MASU. In an implementation, the vector prefetch request is sent to memory higher than the cache associated with the MASU.

The method 800 includes receiving 850 the data in at least one response message from the next memory level. The data or contents associated with the memory addresses are sent back by the next memory level if available. In the event of a cache miss, the vector prefetch request may go through the vector prefetching process again with a MASU of the next memory level.

FIG. 9 is a flowchart of an example method 900 for vector prefetching in accordance with embodiments of this disclosure. The method 900 includes: scanning 910 a missing address storage unit at a defined scanning interval for existence of a relationship between prefetch requests stored in a missing address storage unit; generating 920 a vector prefetch request based on related prefetch requests; sending 930 the vector prefetch request to a next memory level to obtain data associated with the vector prefetch request; and receiving 940 the data in at least one response message from the next memory level. The method 900 may be implemented, as appropriate and applicable, by the computing system 400 of FIG. 4, the computing system 500 of FIG. 5, and the computing system 600 of FIG. 6.

The method 900 includes scanning 910 a missing address storage unit at a defined scanning interval for existence of a relationship between prefetch requests stored in a missing address storage unit. A vector prefetch unit or cache control unit scans a MASU associated with a cache after a defined interval such as a defined number of cycles, a time window, a defined number of prefetch requests, and the like. In an implementation, the relationship can be based on next-line prefetching, next-N-line prefetching, stride prefetching, stream prefetching, consecutive prefetching, sequential prefetching, correlated prefetching, combinations thereof, and the like.

The method 900 includes generating 920 a vector prefetch request based on related prefetch requests. The vector prefetch request is a message or command which includes a tuple identifying a starting memory address or cache block and the number of additional memory addresses or cache blocks. In an implementation, the tuple includes a directional bit(s) to handle memory addresses or cache blocks on either side of the starting memory address or cache block. In an implementation, the tuple includes an offset pattern bit(s) to handle memory addresses or cache blocks which are based on multiple offsets of the starting memory address or cache block. In an implementation, multiple indicators may be used, The method 900 includes sending 930 the vector prefetch request to a next memory level to obtain data associated with the vector prefetch request. The vector prefetch request is sent to a cache higher than the cache associated with the MASU. In an implementation, the vector prefetch request is sent to memory higher than the cache associated with the MASU.

The method 900 includes receiving 940 the data in at least one response message from the next memory level. The data or contents associated with the memory addresses are sent back by the next memory level if available. In the event of a cache miss, the vector prefetch request may go through the vector prefetching process again with a MASU of the next memory level.

Processor cores support a defined cache block size which is optimal for cache packing and mitigating the effects of cache pollution. For example, the defined cache block size is 64 bytes. Interconnection networks or main memory interfaces between a last level cache (LLC) and main memory support a defined cache block size which is optimal for a payload length for messages sent over the main memory interface for utilizing the full available channel bandwidth of the main memory interface. For example, the defined cache block size that is used for the payload for transmitting requested content from the main memory interface is 128 bytes. So, based on such differential cache block sizing considerations, a number of available cache blocks can be determined according to a payload length of the main memory and a cache block size for the last level cache, as described in more detail herein.

Smaller cache block sizes might be more efficient in the processor cores because they cause less pollution in the caches and are faster to transfer to the processor core as compared to bigger cache blocks. The need for bigger cache blocks on the processor core side has diminished as a result of data prefetchers. However, to utilize the main memory channel bandwidth, bigger cache blocks are desired. This is because transferring more data in bursts utilize the main memory channel bandwidth better, particularly for upcoming main memories. Processing of cache requests as between the LLC and main memory in a maximum channel bandwidth utilization manner is described herein.

Described herein are apparatus, device, system, and methods for differential cache block sizing. In an implementation, the method optimizes processor core to LLC access and LLC to main memory access separately by using different cache block sizes. In an implementation, the method optimizes processor core to LLC access and LLC to main memory access separately by requesting multiples of the cache block size as between the LLC to main memory access. In an implementation, the LLC request to the main memory would be integer multiples of the cache block size which can be sent in a channel bandwidth or payload length of the main memory. For example, if a cache block size is X bytes and a main memory channel bandwidth is 2X bytes, then the LLC request to main memory requests 1 cache block of size of 2X. In an implementation, the second X of the cache block is associated with a first X, where associated may include a next-line cache block, next-N-line cache block, stride cache block, stream cache block, consecutive cache block, sequential cache block, correlated cache block, adjacent cache block, combinations thereof, and the like.

In an implementation, the method optimizes processor core to LLC access and LLC to main memory access separately by requesting multiples of the cache block size as between the LLC to main memory access. In an implementation, the LLC request to the main memory would be integer multiples of the cache block size which can be sent in a channel bandwidth of the main memory. For example, if a cache block size is X bytes and a main memory channel bandwidth is 2X bytes, then the LLC request to main memory requests 2 cache blocks of size X bytes. In an implementation, the second cache block is an associated cache block, where associated or association types can include a next-line cache block, next-N-line cache block, stride cache block, stream cache block, consecutive cache block, sequential cache block, correlated cache block, adjacent cache block, combinations thereof, and the like.

In an implementation, a cache replacement algorithm or cache policy of the LLC is augmented to replace multiple cache blocks when appropriate. In an implementation, the associated cache blocks may not be replaced in the LLC if it would require evicting valid data already stored in the LLC.

Figure 11:
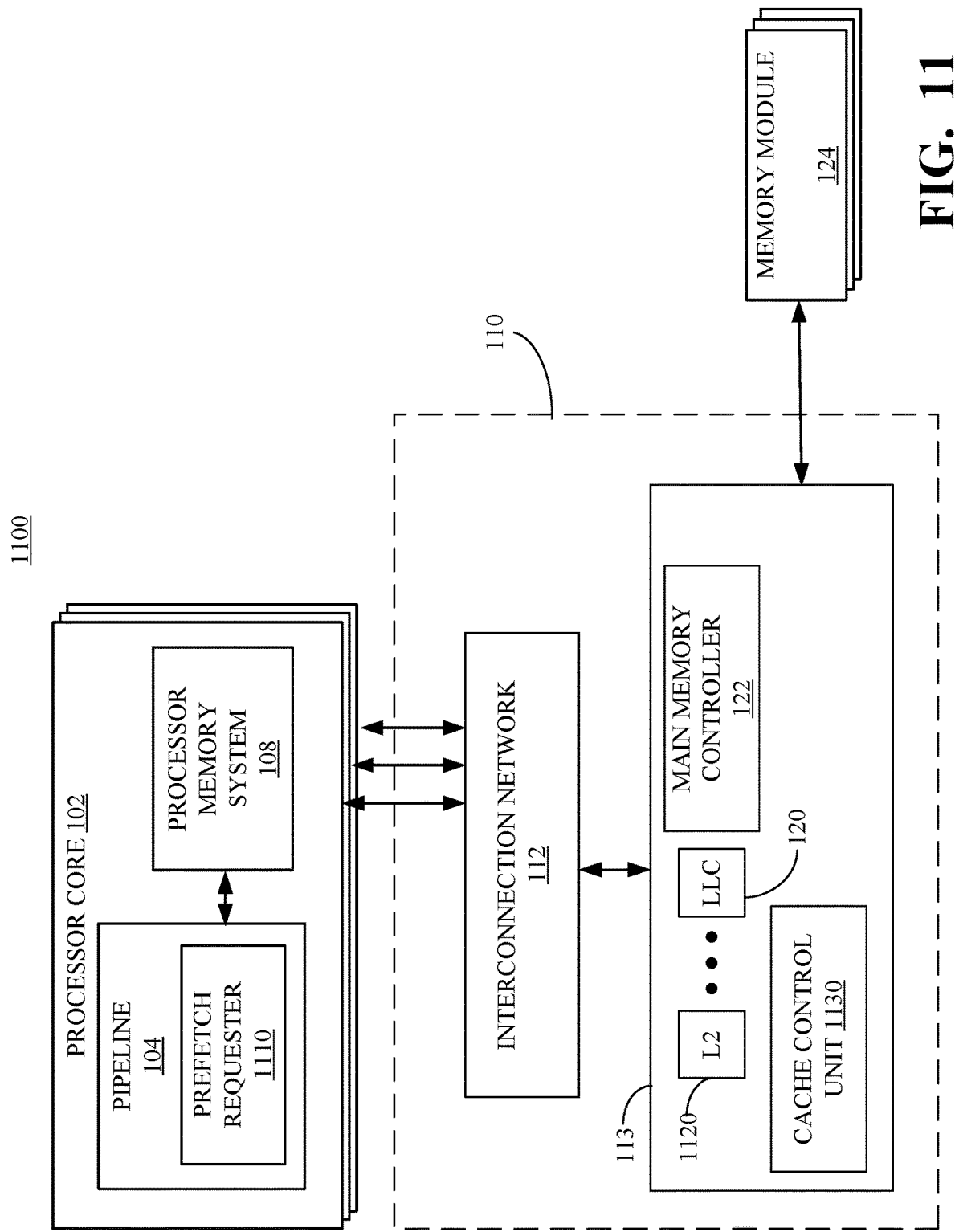
FIG. 11 is an example of a configuration of a computing system for implementing differential cache block sizing.

FIG. 11 is an example of a configuration of a computing system 1100 for implementing differential cache block sizing. In an implementation, components of the computing system 1100 may be provided as upgrades or additions to the computing system 1100 to provide differential cache block sizing. The computing system 1100 includes the elements and functionality as described for FIGS. 1-3 in addition to the elements and functionality described herein. In implementations, the computing system 1100 includes the elements and functionality as described for FIGS. 4-9 in addition to the elements and functionality described herein.

The processor core 102 includes a pipeline 104 and a processor memory system 108. The pipeline 104 of the computing system 1100 includes a prefetch requester 1110 which provides or submits prefetch requests to the processor memory system 108, where each prefetch request is associated with a memory address.

The processor core 102 is in communication with an uncore 110. The uncore 110 includes an interconnection network 112 and an external memory system 113. The external memory system 113 includes a L2 cache 1120, the LLC 120, a cache control unit 1130, and a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

Operationally, assume that a cache block size is X in bytes, for example. Assume the prefetch requestor 410 sends a prefetch request for a cache block. The prefetch request for the cache block is a cache miss with respect to the L2 cache 1120, is processed appropriately, and is a cache miss with respect to the LLC cache 1130. In an implementation, the cache control unit 1130 can send a main memory request including indicator(s) to the main memory controller 122 to fetch, in addition to the missed cache block, associated cache blocks to utilize the channel bandwidth of the main memory, for example, memory module 124. The maximum number of associated cache blocks is determinable by dividing the channel bandwidth or payload length by the cache block size and subtracting one cache block for the missed cache block.

In an implementation, the indicator may be the absence of a least significant bit in a memory address associated with the missed cache block that is sent in the request to the to the main memory controller 122. The lack of the least significant bit would trigger the main memory controller 122 to fetch the associated cache block(s). In an implementation, the indicator can be an offset value from which to obtain the associated cache block. In an implementation, the indicator can indicate how many associated cache blocks to fetch. In an implementation, the indicator can indicate an address(es) for the associated cache block(s). In an implementation, the indicator can indicate a starting address and how many associated cache blocks. In an implementation, the indicator can indicate a direction based on the memory address of the missed cache block. For example, the direction can indicate the associated cache block(s) is after the memory address of the missed cache block or before the memory address of the missed cache block. In an implementation, the indicator can be a memory address for the missed cache block and an association type as described herein. In an implementation, the indicator can be a combination of those described herein.

The main memory controller 122, as appropriate and as needed, depending on the indicator(s) in the main memory request, can take steps to formulate fetching of the missed cache block and the associated cache block(s) from the main memory 124. The main memory controller 122 returns the data associated with the missed cache block and the associated cache block(s) to the LLC 120 via the cache control unit 1130. The cache control unit 1130 stores the data associated with the missing cache block in the LLC 120. The cache control unit 1130 may store the data associated with the associated cache block(s) depending the cache replacement algorithm or cache policy. In an implementation, the cache control unit 1130 stores the data associated with the associated cache block(s) by evicting currently stored data in accordance with the cache replacement algorithm or cache policy.

In an illustrative example, assume that the cache block size is 64 bytes and that the channel bandwidth of the main memory is 128 bytes. A cache control unit for the LLC would request two 64 byte blocks to fully utilize the channel bandwidth. In this illustrative example, the 128 byte block are aligned in a defined manner with respect to the memory space and each 64 byte block can occur in either a first or second position of a 128 byte block. In some implementations, if the second 64 byte block of a 128 byte block is the missed cache block, then the cache control unit for the LLC will also request an associated cache block for the first 64 byte block. Alternatively, if the first 64 byte block of the 128 byte block is the missed cache block, then the cache control unit for the LLC will request an associated cache block for the second position of the 128 byte block. In an implementation, the cache control unit for the LLC can send the most significant 6 bits of any 7 bit block address and not send the least significant bit. The cache control unit for the LLC can then use the dropped bit to select one of the 64 byte blocks of the returned 128-byte block as the missed cache block. In an implementation, the cache control unit for the LLC can send addresses for both of the 64 byte blocks. In an implementation, the cache control unit for the LLC can send a directional indicator with respect to missed cache block to obtain the second 64 byte block. Storing of the data for the associated cache block is dependent on the cache replacement algorithm or cache policy.

In implementations, the computing system 1100 can be supplemented with any of FIGS. 4-9 to include vector prefetching as described herein.

Figure 12:
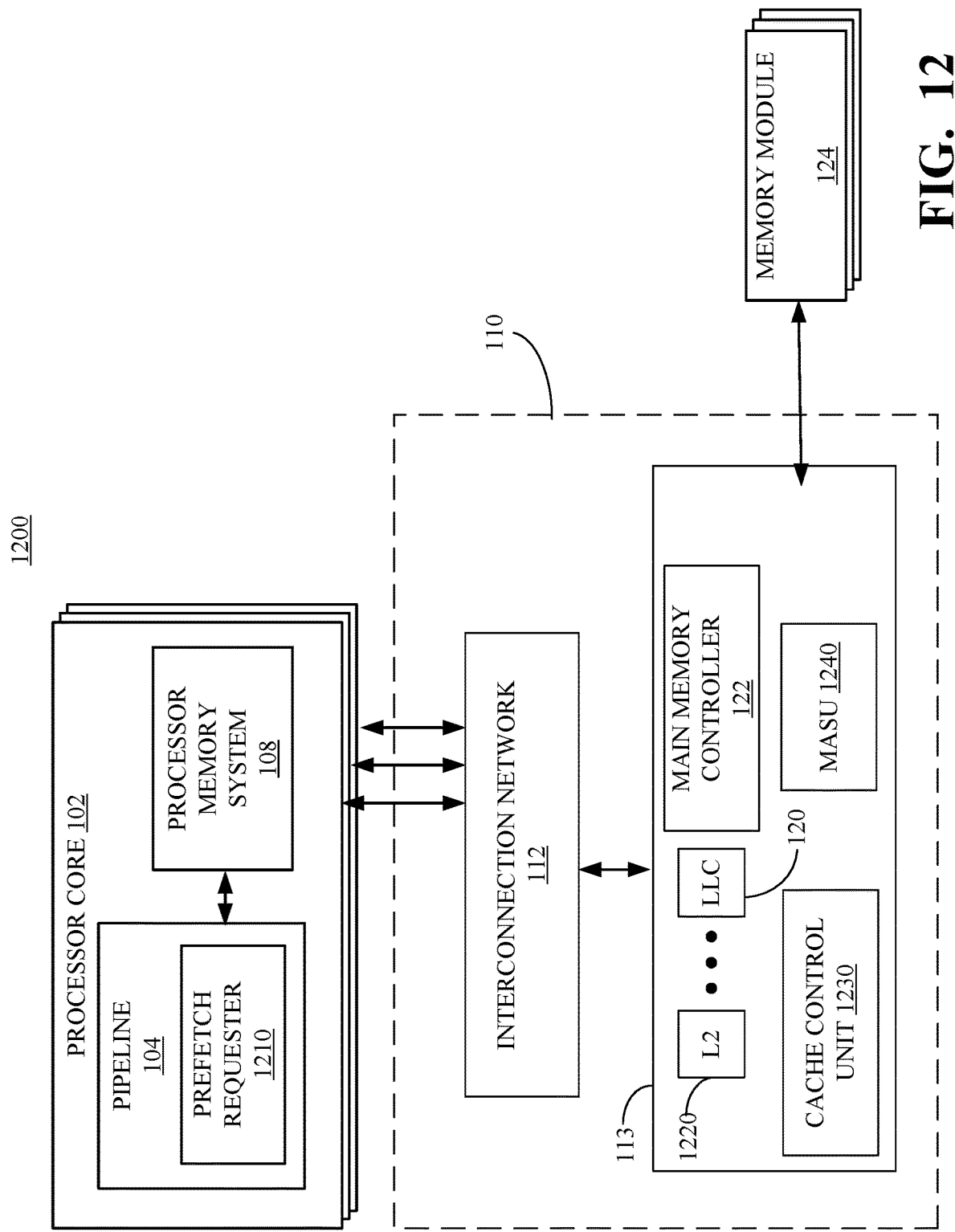
FIG. 12 is an example of a configuration of a computing system for implementing differential cache block sizing and vector prefetching.

FIG. 12 is an example of a configuration of a computing system 1200 for implementing differential cache block sizing and vector prefetching. In an implementation, components of the computing system 1200 may be provided as upgrades or additions to the computing system 1200 to provide differential cache block sizing. The computing system 1200 includes the elements and functionality as described for FIGS. 1-3 in addition to the elements and functionality described herein. In implementations, the computing system 1200 includes the elements and functionality as described for FIGS. 4-9 and 11 in addition to the elements and functionality described herein.

The processor core 102 includes a pipeline 104 and a processor memory system 108. The pipeline 104 of the computing system 1200 includes a prefetch requester 1210 which provides or submits prefetch requests to the processor memory system 108, where each prefetch request is associated with a memory address.

The processor core 102 is in communication with an uncore 110. The uncore 110 includes an interconnection network 112 and an external memory system 113. The external memory system 113 includes a L2 cache 1120, the LLC 120, a cache control unit 1130, a MASU 1240, and a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules. In an implementation, the MASU may be implemented and deployed as shown in FIGS. 4-6.

Operationally, in addition to the functionality described for computing system 400, computing system 500, computing system 600, and computing system 1100, the cache control unit 1230 determines from the indicator(s) in a vector prefetch request the size of the vector prefetch request cache blocks including the starting cache block and related cache blocks, and related information. If the cache control unit 2130 determines that there is channel bandwidth available, then the cache control unit 1230 can scan the MASU 1240 to determine the existence of a relationship between the vector prefetch request cache blocks and cache blocks associated with prefetch request entries in the MASU 1240.

If there are related cache blocks from the MASU 1240, then the cache control unit 1230 again determines if there is channel bandwidth available. If there is channel bandwidth available, or if there are no cache blocks related to the vector prefetch request cache blocks, then the cache control unit 1230 can add associated cache blocks as described herein. The cache control unit 1230 would generate and send a main memory request including indicator(s) which indicates the vector prefetch request cache blocks, any related cache blocks, and any associated cache blocks (collectively the "merged cache blocks').

The main memory controller 122, as appropriate and as needed, depending on the indicator(s) in the main memory request, can take steps to formulate fetching of the merged cache blocks from the main memory 124. The main memory controller 122 returns the data associated with the merged cache blocks, as applicable to the LLC 120 via the cache control unit 1230. The cache control unit 1230 stores the data associated with the vector prefetch request cache blocks and any related cache blocks in the LLC 120. The cache control unit 1230 may store the data associated with the associated cache block(s) depending on the cache replacement algorithm or cache policy. In an implementation, the cache control unit 1230 stores the data associated with the associated cache block(s) by evicting currently stored data in accordance with the cache replacement algorithm or cache policy.

Figure 13:
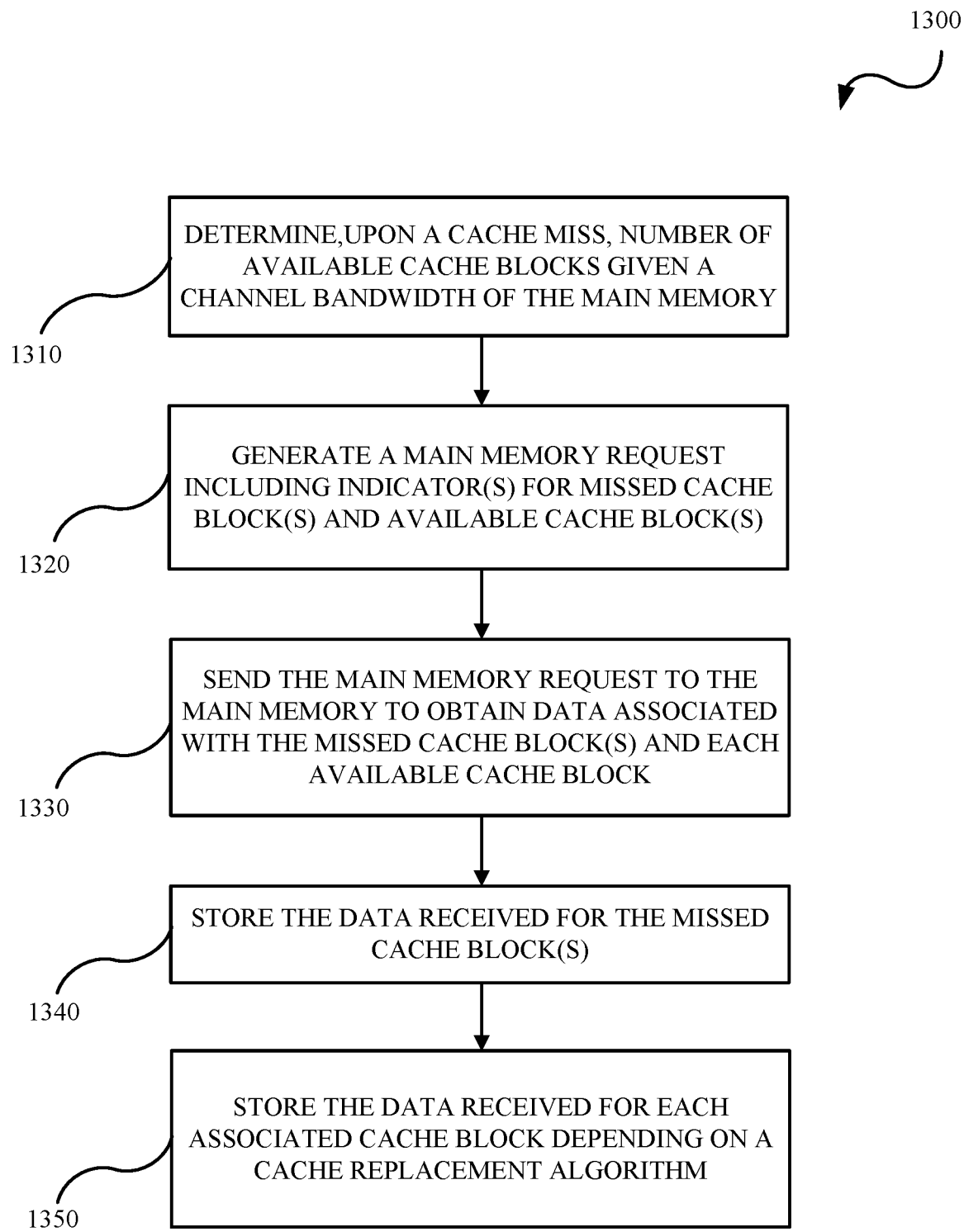
FIG. 13 is a flowchart of an example technique for differential cache block sizing.

FIG. 13 is a flowchart of an example method 1300 for differential cache block sizing. The method 1300 includes: determining 1310, upon a cache miss, number of available cache blocks given a channel bandwidth of the main memory; generating 1320 a main memory request including indicator(s) for missed cache block(s) and available cache block(s); sending 1330 the main memory request to the main memory to obtain data associated with the missed cache block(s) and each available cache block; storing 1340 the data received for the missed cache block(s); and storing 1350 the data received for each associated cache block depending on a cache replacement algorithm. The method 1300 may be implemented, as appropriate and applicable, by the computing system 1100 of FIG. 11 and the computing system 1200 of FIG. 12.

The method 1300 includes determining 1310, upon a cache miss, number of available cache blocks given a channel bandwidth of the main memory. Caches, such as a last level cache (LLC), have a defined cache block size. Main memories have a defined channel bandwidth which in turn defines an optimal block size that can be sent over the channel bandwidth. The optimal block size can be divided by the cache block size to determine the maximum number of cache blocks that may be requested. In the event the cache miss is for a prefetch request, the number of available cache blocks is the maximum number of cache blocks minus the missed cache block. In the event the cache miss is for a vector prefetch request as described in FIGS. 4-9, the number of available cache blocks is the maximum number of cache blocks minus the vector prefetch request cache blocks which includes a starting cache block and a number of related cache blocks.

The method 1300 includes generating 1320 a main memory request including indicator(s) for missed cache block(s) and for available cache block(s). In the event the cache miss is for a prefetch request, the number of associated cache blocks is the number of available cache blocks. The cache control unit determines indicator(s), as described herein, to indicate the missed cache block(s) and the associated cache blocks. In an implementation, in the event the cache miss is for a vector prefetch request as described in FIGS. 4-9, the cache control unit determines if a MASU associated with the LLC has any related cache blocks and if so, these are subtracted from the number of available cache blocks. The cache control unit determines indicator(s), as described herein, to indicate the missed vector prefetch request cache blocks, any related cache blocks, and any associated cache blocks. In an implementation without a MASU associated with the LLC, in the event the cache miss is for a vector prefetch request as described in FIGS. 4-9, the cache control unit determines indicator(s), as described herein, to indicate the missed vector prefetch request cache blocks and any associated cache blocks.

The method 1300 includes sending 1330 the main memory request to the main memory to obtain data associated with the missed cache block(s) and each available cache block. The cache control unit sends the main memory request to the main memory controller, which processes the main memory request, if needed, to fetch the data from the main memory. In the event the main memory request is based on a prefetch request, the main memory controller will fetch data for the missed cache block and each associated cache block. In an implementation, in the event the main memory request is based on a vector prefetch request, the main memory controller will fetch data for the missed vector prefetch request cache blocks including the starting cache block and related cache blocks, any related cache blocks, and any associated cache blocks. In an implementation, in the event the main memory request is based on a vector prefetch request, the main memory controller will fetch data for the missed vector prefetch request cache blocks including the starting cache block and related cache blocks and any associated cache blocks.

The method 1300 includes storing 1340 the data received for the missed cache block(s). In the event the main memory request is based on a prefetch request, the cache control unit will store the data associated with the missed cache block. In an implementation, in the event the main memory request is based on a vector prefetch request, the cache control unit will store the data associated with the starting cache block, related cache blocks, and any related cache blocks. In an implementation, in the event the main memory request is based on a vector prefetch request, the cache control unit will store the data associated with the starting cache block and related cache blocks.

The method 1300 includes storing 1350 the data received for each associated cache block depending on a cache replacement algorithm. The cache control unit determines if data can be evicted from the cache before storing the data received for each associated cache block.

Figure 14:
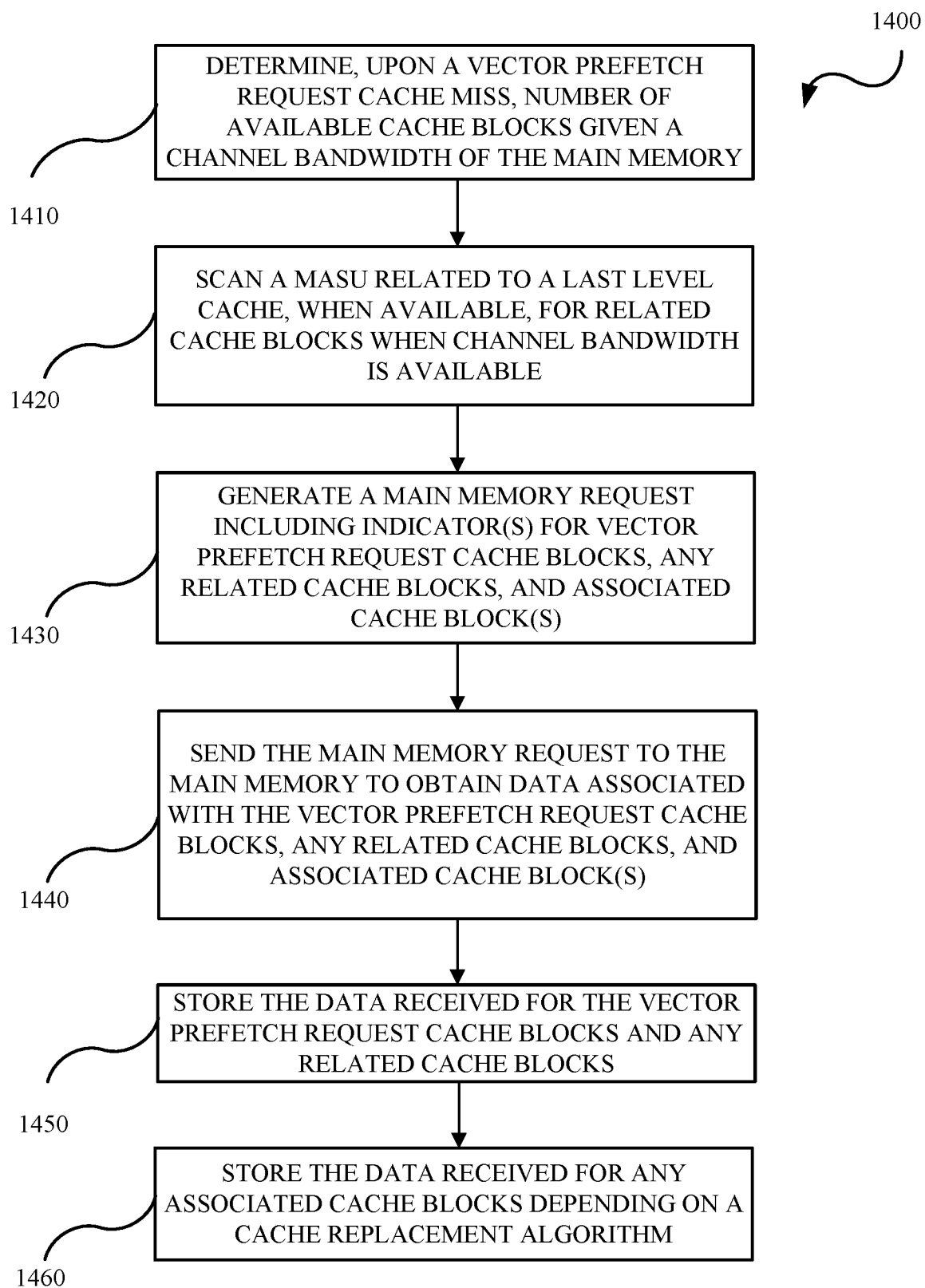
FIG. 14 is a flowchart of an example technique for differential cache block sizing.

FIG. 14 is a flowchart of an example method 1400 for differential cache block sizing. The method 1400 includes: determining 1410, upon a vector prefetch request cache miss, number of available cache blocks given a channel bandwidth of the main memory; scanning 1420 a MASU related to a last level cache, when available, for related cache blocks when channel bandwidth is available; generating 1430 a main memory request including indicator(s) for vector prefetch request cache blocks, any related cache blocks, and associated cache block(s); sending 1440 the main memory request to the main memory to obtain data associated with the vector prefetch request cache blocks, any related cache blocks, and associated cache block(s); storing 1450 the data received for the vector prefetch request cache blocks and any related cache blocks; and storing 1460 the data received for any associated cache blocks depending on a cache replacement algorithm. The method 1400 may be implemented, as appropriate and applicable, by the computing system 1100 of FIG. 11 and the computing system 1200 of FIG. 12.

The method 1400 includes determining 1410, upon a vector prefetch request cache miss, number of available cache blocks given a channel bandwidth of the main memory. Caches, such as a last level cache (LLC), have a defined cache block size. Main memories have a defined channel bandwidth which in turn defines an optimal block size that can be sent over the channel bandwidth. The optimal block size can be divided by the cache block size to determine the maximum number of cache blocks that may be requested. The number of available cache blocks is the maximum number of cache blocks minus the vector prefetch request cache blocks which includes a starting cache block and a number of related cache blocks.

The method 1400 includes scanning 1420 a MASU related to a last level cache, when available, for related cache blocks when channel bandwidth is available. The scanning may be performed as described with respect to FIGS. 4-9.

The method 1400 includes generating 1430 a main memory request including indicator(s) for vector prefetch request cache blocks, any related cache blocks, and associated cache block(s). The cache control unit determines indicator(s), as described herein, to indicate the vector prefetch request cache blocks, any related cache blocks, and any associated cache blocks.

The method 1400 includes sending 1440 the main memory request to the main memory to obtain data associated with the vector prefetch request cache blocks, any related cache blocks, and associated cache block(s). The cache control unit sends the main memory request to the main memory controller, which processes the main memory request, if needed, to fetch the data from the main memory. The main memory controller will fetch data for the vector prefetch request cache blocks including the starting cache block and related cache blocks, any related cache blocks, and any associated cache blocks.

The method 1400 includes storing 1450 the data received for the vector prefetch request cache blocks and any related cache blocks. The cache control unit will store the data associated with the starting cache block, related cache blocks, and any related cache blocks.

The method 1400 includes storing 1460 the data received for any associated cache blocks depending on a cache replacement algorithm. The cache control unit determines if data can be evicted from the cache before storing the data received for any associated cache block.

For simplicity of explanation, the techniques 700, 800, 900, 1300, and 1400 are depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of a computing system for vector prefetching, differential cache block sizing, and combinations thereof (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for differential cache block sizing, the method, comprising:
   determining, for a missed cache block from a cache miss at a cache, one or more associated cache blocks based on a difference between an available channel bandwidth of a main memory interface to a main memory and a cache block size for the cache;
   generating a main memory request including at least one indicator for the missed cache block and the determined one or more associated cache blocks;
   sending the main memory request to the main memory to obtain data associated with the missed cache block and each of the determined one or more associated cache blocks;
   storing the data received for the missed cache block in the cache after evicting valid data from the cache; and
   storing the data received for each of the determined one or more associated cache blocks in the cache depending on a cache replacement algorithm that determines whether or not to store the data received for each of the determined one or more associated cache blocks based on whether or not cached data identified by the cache replacement algorithm is valid.

2. The method of claim 1, when the cache miss is for a prefetch request, and the one or more associated cache blocks comprise at least one cache block positioned adjacent to the missed cache block.

3. The method of claim 2, wherein the cache block positioned adjacent to the missed cache block comprises a cache block in a selected position on either side of the missed cache block depending on alignment of a smaller byte block size within a larger byte block size.

4. The method of claim 3, wherein the at least one indicator includes an address associated with the missing cache block and a type of association.

5. The method of claim 1, wherein the at least one indicator includes an address associated with the missing cache block and a memory address for each of the determined one or more associated cache blocks.

6. The method of claim 1, further comprising:
   determining if the cached data identified by the cache replacement algorithm is valid; and
   if the data identified by the cache replacement algorithm is not valid, storing the data received for each of the determined one or more associated cache blocks in the cache after eviction of the cached data identified by the cache replacement algorithm.

7. The method of claim 1, when the cache miss is for a vector prefetch request, the missed cache block is a starting cache block of a set of vector prefetch request cache blocks including the starting cache block and one or more related cache blocks that are related to the starting cache block, and the determined one or more associated cache blocks have an association to at least one of the vector prefetch request cache blocks.

8. The method of claim 7, wherein the association is based on at least one of next-line prefetching, next-N-line prefetching, stride prefetching, stream prefetching, consecutive prefetching, sequential prefetching, and correlated prefetching.

9. The method of claim 8, wherein the one or more associated cache blocks are determined by:
   scanning a missing address storage unit (MASU) accessible to the cache to determine the existence of a relationship between the vector prefetch request and any associated cache blocks associated with one or more entries in the MASU.

10. The method of claim 1, wherein a relationship between the missed cache block and the one or more associated cache blocks is based on at least one of next-line prefetching, next-N-line prefetching, stride prefetching, stream prefetching, consecutive prefetching, sequential prefetching, correlated prefetching, and a direction based on either side of the missed cache block.

11. The method of claim 1, wherein the cache is a last level cache.

12. A method for differential cache block sizing, the method, comprising:
   determining, upon a vector prefetch request at a cache, a number of available cache blocks based on a payload length corresponding to an available channel bandwidth of a main memory interface to a main memory and a cache block size for the cache, the vector prefetch request comprising a request for vector prefetch request cache blocks including a starting cache block and one or more related cache blocks that are related to the starting cache block;
   scanning, when there are available cache blocks, a missing address storage unit (MASU) accessible to the cache to determine the existence of a relationship between the vector prefetch request and any associated cache blocks associated with one or more entries in the MASU;
   generating a main memory request including indicators for the vector prefetch request cache blocks, and any associated cache blocks, wherein a sum of a number of vector prefetch request cache blocks added to a number of any associated cache blocks is equal to the determined number of available cache blocks;
   sending the main memory request to the main memory to obtain data associated with the vector prefetch request cache blocks, and any associated cache blocks;
   storing the data received for the vector prefetch request cache blocks in the cache after evicting valid data from the cache; and
   storing the data received for each of the associated cache blocks in the cache depending on a cache replacement algorithm that determines whether or not to store the data received for each of the associated cache blocks based on whether or not cached data identified by the cache replacement algorithm is valid.

13. The method of claim 12, wherein the relationship between the vector prefetch request and the associated cache blocks is based on at least one of next-line prefetching, next-N-line prefetching, stride prefetching, stream prefetching, consecutive prefetching, sequential prefetching, and correlated prefetching.

14. The method of claim 13, wherein the indicators include an address associated with at least one of the vector prefetch request cache blocks and a type of association.

15. The method of claim 13, wherein indicators include an address associated with at least one of the vector prefetch request cache blocks and a memory address for each of the associated cache blocks.

16. The method of claim 12, further comprising:
   determining if the cached data identified by the cache replacement algorithm is valid; and
   if the data identified by the cache replacement algorithm is not valid, storing the data received for each of the associated cache blocks in the cache after eviction of the cached data identified by the cache replacement algorithm.

17. The method of claim 12, wherein the relationship between the vector prefetch request and the associated cache blocks is based on a direction based on either side of at least one of the vector prefetch request cache blocks.

18. The method of claim 12, wherein the cache is a last level cache.

19. A computing system for differential cache block sizing, comprising:
   a hierarchical memory system including multiple caches including a first cache;
   a prefetcher configured to generate and send prefetch requests towards the hierarchical memory system; and
   a cache control unit associated with the first cache, the cache control unit configured to:
      determine, for a missed cache block from a cache miss, one or more associated cache blocks based on a difference between an available channel bandwidth of a main memory interface to a main memory and a cache block size for the first cache;
      generate a main memory request including at least one indicator for the missed cache block and the determined one or more associated cache blocks;

send the main memory request to the main memory to obtain data associated with the missed cache block and each of the determined one or more associated cache blocks;

store the data received for the missed cache block in the first cache after evicting valid data from the cache; and store the data received for each of the determined one or more associated cache blocks in the first cache depending on a cache replacement algorithm that determines whether or not to store the data received for each of the determined one or more associated cache blocks based on whether or not cached data identified by the cache replacement algorithm is valid.

20. The computing system of claim 19, when the cache miss is for a prefetch request, and the one or more associated cache blocks comprises a cache block in a selected position on either side of the missed cache block depending on alignment of a smaller byte block size within a larger byte block size.

21. The computing system of claim 19, when the cache miss is for a vector prefetch request, the missed cache block is a starting cache block of a set of vector prefetch request cache blocks including the starting cache block and one or more related cache blocks that are related to the starting cache blocks, and the determined one or more associated cache blocks have an association to at least one of the vector prefetch request cache blocks, and the association is based on at least one of next-line prefetching, next-N-line prefetching, stride prefetching, stream prefetching, consecutive prefetching, sequential prefetching, and correlated prefetching.

22. The computing system of claim 21, further comprising:

a missing address storage unit (MASU) accessible to the first cache, wherein the missing address storage unit is configured to store a prefetch request which suffers a cache miss; and the cache control unit configured to:

scan the MASU to determine the existence of a relationship between the vector prefetch request and any associated cache blocks associated with one or more entries in the MASU, wherein a relationship between the missed cache block and the one or more associated cache blocks is based on at least one of next-line prefetching, next-N-line prefetching, stride prefetching, stream prefetching, consecutive prefetching, sequential prefetching, correlated prefetching, and a direction based on either side of at least one of the vector prefetch request cache blocks.

23. The computing system of claim 19, wherein the first cache is a last level cache.

* * * * *